(12) United States Patent  (10) Patent No.: US 7,467,122 B2
Morita et al.  (45) Date of Patent: Dec. 16, 2008

(54) SYSTEM FOR AIDING THE DESIGN OF PRODUCT CONFIGURATION

(75) Inventors: Hirotaka Morita, Yokosuka (JP); Shingo Akasaka, Zushi (JP); Atsuhiro Ishida, Yokohama (JP); Hiroshi Sora, Kawasaki (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 11/266,205

(22) Filed: Nov. 4, 2005

(65) Prior Publication Data

US 2006/0129261 A1 Jun. 15, 2006

(30) Foreign Application Priority Data

Nov. 5, 2004 (JP) .............................. 2004-321552

(51) Int. Cl.
G06F 17/30 (2006.01)
G06F 17/50 (2006.01)
G09B 25/02 (2006.01)
(52) U.S. Cl. ........................................ 706/47; 434/367

(58) Field of Classification Search .................. 706/47; 434/367
See application file for complete search history.

(56) References Cited

U.S. PATENT DOCUMENTS 5,552,995 A * 9/1996 Sebastian ..................... 700/97

FOREIGN PATENT DOCUMENTS

| JP | 2001-142935 | 5/2001 |
| JP | 2002-304551 | 10/2002 |

* cited by examiner

Primary Examiner—David Vincent
Assistant Examiner—Nathan H Brown, Jr.
(74) Attorney, Agent, or Firm—Antonelli, Terry, Stout & Kraus, LLP.

(57) ABSTRACT

While a base model has been determined for a product, in a system for performing a configuration designing operation of the product by setting a specification value to a specification item of the product, a product configuration design aiding system aids that a configuration designer can easily perform the configuration designing operation while following a restriction condition of a specification value of a specification item. A specification configuration information database is constructed which describes restriction conditions available for the specification values with respect to the specification item, and a configuration designing screen for inputting the specification values with respect to the specification item is displayed so as to conduct an input by the configuration designer.

8 Claims, 18 Drawing Sheets

FIG.3

| SPECIFICATION ITEM | | SPECIFICATION VALUE | | APPLICATION | RESTRICTION |
|---|---|---|---|---|---|
| CODE | NAME | CODE | NAME | XX1 | |
| 1000A | FREQUENCY | 1000A01 | 50Hz | XX1 | |
| | | 1000A03 | 60Hz | XX1 | |
| 1002A | OUTPUT | 1002A00 | 15kW | XX1 | |
| | | 1002A02 | 20kW | XX1 | |
| | | 1002A04 | 25kW | XX1 | ○ |
| | | 1002A06 | 40kW | | |
| 1005B | EXPLOSION-PROOF SPECIFICATION | 1005A01 | EQUIPPED WITH EXPLOSION-PROOF TYPE OUTER | XX1 | ○ |

FIG.4

| SPECIFICATION ITEM | SPECIFICATION VALUE | | RESTRICTION | | | APPLICATION |
|---|---|---|---|---|---|---|
| | CODE | NAME | SPECIFICATION ITEM | SPECIFICATION VALUE | RELATIONSHIP | |
| 1002A  OUTPUT | 1002A00 | 15kW | | | | XX1 |
| | 1002A02 | 20kW | 1010A | 1010A01 | AND | XX1 |
| | 1002A04 | 25kW | 1010A | 1010A01 | AND | XX1 |
| | | | 2002A | 2002A00 | OR | |
| | | | | 2002A01 | OR | |
| | 1002A06 | 40kW | | | | |

FIG.5

| SPECIFICATION VALUE 332 | | PRIORITY SPECIFICATION VALUE 333 | VALIDITY TERM 334 | UNIT PRICE 335 | TERM 336 | LT 337 | TERM 338 |
|---|---|---|---|---|---|---|---|
| CODE | NAME | | | | | | |
| 1002A00 | 15kW | | ~ | ¥0 | ~ | 5 DAYS | ~ |
| 1002A02 | 20kW | 1 | ~ | ¥0 | ~ | | ~ |
| 1002A04 | 25kW | | ~ | ¥50,000 | ~ | | ~ |
| 1002A06 | 40kW | | ~ | ¥120,000 | ~ | 30 DAYS | ~ |

ADD

| SPECIFICATION ITEM 1302 | | SPECIFICATION VALUE 1303 | | APPLICATION XX1 1305 | RESTRICTION 1307 |
|---|---|---|---|---|---|
| CODE | NAME | CODE | NAME | | |
| 1000A | FREQUENCY | 1000A01 | 50Hz | ○ | |
| | | 1000A03 | 60Hz | ○ | |
| 1002A | OUTPUT | 1002A00 | 15kW | ○ | |
| | | 1002A02 | 20kW | ○ | |
| | | 1002A04 | 25kW | ○ | ○ |
| | | 1002A06 | 40kW | | |
| 1005B | EXPLOSION-PROOF SPECIFICATION | 1005A01 | EQUIPPED WITH EXPLOSION-PROOF TYPE OUTER | ○ | ○ |

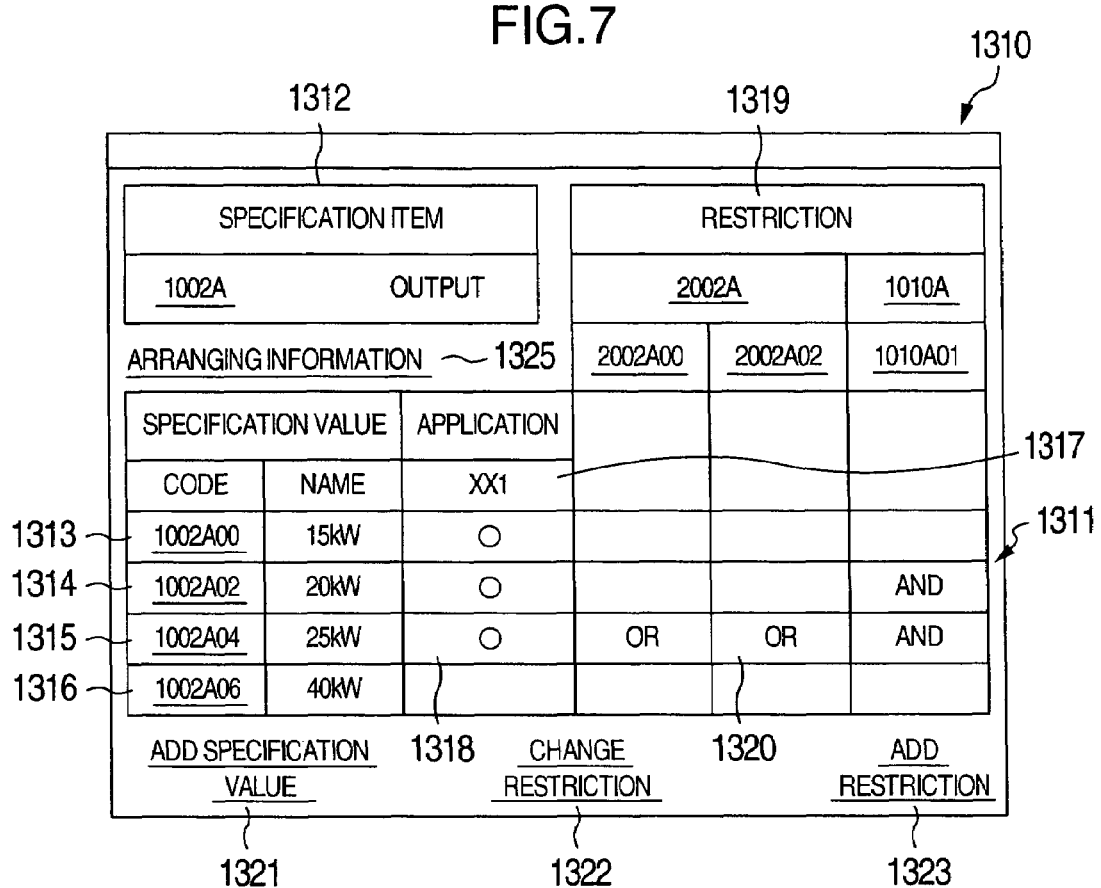

FIG.9

| MANAGE-MENT NUMBER | CUSTOMER CODE | CUSTOMER NAME | PRODUCT TYPE | NUMBER | APPOINTED DELIVERY DATE | PRICE | SPECIFI-CATION | STATUS |
|---|---|---|---|---|---|---|---|---|
| 001 | a01 | ◯Yama Industry | XX1 | 1 | 040630 | ¥1,500,000 | STANDARD | COMPLETE |
| 003 | b55 | △Ki | XX1 | 1 | 040630 | ¥750,000 | STANDARD | ◯ |
| 004 | d06 | ◯Kawa Manufacturing | AB2 | 1 | 040702 | — | NON-STANDARD | ◯ |
| 007 | w00 | ✕ Mfg.co.,Ltd | YY1 | 2 | 040715 | ¥1,000,000 | STANDARD | ◯ |
| 009 | t44 | Yama◯Micronics | JK4 | 1 | 040716 | — | STANDARD | △ |
| 015 | e01 | Sa◯Machine | WQ1 | 1 | 040720 | — | NON-STANDARD | △ |
| 021 | a05 | AD☐ | XX1 | 5 | 040711 | — | — | — |

FIG.10

NEW SUBJECT

| MANAGE-MENT NUMBER | CUSTOMER CODE | CUSTOMER NAME | PRODUCT TYPE | NUMBER | APPOINTED DELIVERY DATE | PRICE | SPECIFI-CATION | STATUS |
|---|---|---|---|---|---|---|---|---|
| 001 | a01 | ◯Yama Industry | XX1 | 1 | 040630 | ¥1,500,000 | STANDARD | COMPLETE |
| 003 | b55 | △Ki | XX1 | 1 | 040630 | ¥750,000 | STANDARD | ◯ |
| 004 | d06 | ◯Kawa Manufacturing | AB2 | 1 | 040702 | — | NON-STANDARD | ◯ |
| 007 | w00 | ✕ Mfg.co.,Ltd | YY1 | 2 | 040715 | ¥1,000,000 | STANDARD | ◯ |
| 009 | t44 | Yama◯Micronics | JK4 | 1 | 040716 | — | STANDARD | △ |
| 015 | e01 | Sa◯Machine | WQ1 | 1 | 040720 | — | NON-STANDARD | △ |
| 021 | a05 | AD☐ | XX1 | 5 | 040711 | — | — | — |

| SPECIFICATION ITEM | SPECIFICATION VALUE | RULE |
|---|---|---|
| OUTPUT | 15kW | DEFAULT |
| SPEED | 40m/s | DEFAULT |
| ILLUMINATING APPLIANCE | MANUFACTURED BY COMPANY "H" MANUFACTURED BY COMPANY "M" MANUFACTURED BY COMPANY "T" | CHANGE ILLUMINATING APPLIANCE TO BE EMPLOYED BY CUSTOMER |
| POWER APPLIANCE | — | JUDGE BASED UPON PRICE AND LT |
| SAFETY APPARATUS | — | LOW-COST AUTOMATIC SAFETY APPARATUS |

FIG.19

PRODUCT XX1

| EVALUATION | SELECTED RESULT | ☑ SUBSTITUTION IDEA (1) | ... | DIFFERENCE |
|---|---|---|---|---|
| SPECIFICATION CONFIGURATION | OUTPUT: 30 KW | | | TWO ITEMS, CORRECT, (NO ESSENTIAL ITEM) |
| | × × | △△ | | |
| | × × | ○○ | | |
| PRICE | HIGHER THAN, OR EQUAL TO +¥50,000 | ¥2,000 | | HIGHER THAN, OR EQUAL TO +¥48,000 |
| APPOINTED DELIVERY DATE | | ZERO DAY | | LONGER THAN, OR EQUAL TO +20DAYS |
| ... | | | | |
| | | | | |

FIG.20

EDIT MENU

- PRODUCT
- SPECIFICATION
- SPECIFICATION GROUP

END

FIG.21

1331 SPECIFICATION ITEM
3001A  BUTTON NUMBER

1333

| | CALCULATION CONDITION | RESTRICTION | | |
|---|---|---|---|---|
| | 4000B | 3500D | | 1010A |
| | | 3500D01 | 3500D02 | 1010A01 |

| SPECIFICATION ITEM | | APPLICATION | | | | |
|---|---|---|---|---|---|---|
| CODE | NAME | XX1 | | | | |
| 3001A00 | BUTTON NUMBER | ○ | ○ | | AND | AND |

1332

1317

1336  DESIGN CALCULATION FORMULA  1339

= 4000B ×2

ADD SPECIFICATION VALUE    CHANGE RESTRICTION    ADD RESTRICTION 1321       1322       1323

FIG.22

1331 SPECIFICATION ITEM
3001A  BUTTON NUMBER

1333

| | CALCULATION CONDITION | RESTRICTION | | |
|---|---|---|---|---|
| | 4000B | 3500D | | 1010A |
| | | 3500D01 | 3500D02 | 1010A01 |

| SPECIFICATION ITEM | | APPLICATION | | | | |
|---|---|---|---|---|---|---|
| CODE | NAME | XX1 | | | | |
| 3001A00 | BUTTON NUMBER | ○ | ○ | | AND | AND |
| 3001A01 | BUTTON NUMBER | ○ | ○ | AND | | AND |

1332
1341

1337  DESIGN CALCULATION FORMULA  1339

= 4000B ×2

ADD SPECIFICATION VALUE    CHANGE RESTRICTION    ADD RESTRICTION 1321       1322       1323

| SPECIFICATION ITEM | 3001A | BUTTON NUMBER |
| SPECIFICATION VALUE | 3001A00 | BUTTON NUMBER |
| VALIDITY TERM | 2005/09/01 ~ 2010/09/01 |
| CALCULATION FORMULA | = 4000B x2 | CALCULATION FORMULA |
| PRICE | | |
| STANDARD APPOINTED DELIVERY DATE | | |
| IMAGE | | |

SPECIFICATION ITEM

4000B   BUTTON NUMBER — 1361

1362

DESIGN CALCULATION FORMULA

- SPECIFICATION ITEM — 3001A  BUTTON NUMBER
- SPECIFICATION VALUE — 3001A00  BUTTON NUMBER
- VALIDITY TERM — 2005/09/01 ~ 2010/09/01
- PRICE
- STANDARD APPOINTED DELIVERY DATE
- IMAGE
- RESTRICTION FORMULA — ≦ ▼ | 4000B x2 | CALCULATION FORMULA
- ADD 1370, 1371, 1372, 1373

FIG.26

CONFIGURATION DESIGN MENU

- 501 — NEW SUBJECT
- 502 — SUBJECT LIST

END — 503

MACHINE SORT : ×× (○○)
TYPE : ×× (○○)

BASIC SPECIFICATION ▼    ≤ PREVIOUS  NEXT ≥    REGISTER SUBJECT

| LIMITED PASSENGER | ▼ |
| SPEED | ▼ |
| INSTALLED NUMBER | ▼ |

END

FIG.28

REGISTER SUBJECT    DELETE SUBJECT    EDIT SUBJECT    REGISTER SUBJECT

| MANAGEMENT NUMBER | |
| NAME | |
| CUSTOMER | |

| | MACHINE SORT | TYPE | NUMBER | STANDARD PRICE | STANDARD APPOINTED DELIVERY DATE |
|---|---|---|---|---|---|
| ☐1 | | | | | |
| ☐2 | | | | | |

END    ADD    DELETE    COPY

FIG.31

| SUBJECT NO. | SUBJECT | CUSTOMER | MACHINE SORT | TYPE | UPDATED DATE | ... |
|---|---|---|---|---|---|---|
| ☐ 001 | | | | | | |
| ☐ 002 | | | | | | |
| ☐ 003 | XXXX | XXXX ○○Co.,Ltd. | XXXX | XXXX ○○ | 2005/09/30 | |
| | | | | | | |

SUBJECT LIST

END    COPY

SYSTEM FOR AIDING THE DESIGN OF PRODUCT CONFIGURATION

INCORPORATION BY REFERENCE

The present application claims priority from Japanese application JP2004-321552 filed on Nov. 5, 2004, the content of which is hereby incorporated by reference into this application.

BACKGROUND OF THE INVENTION

The present invention relates to a product configuration design aiding system. More specifically, the present invention is directed to such a product configuration design aiding system which is suitably employed in design aiding of ordered products, by which specifications of the products which constitute a base are changed in response to requirements of customers so as to design configurations of product specifications.

A configuration designing operation of an ordered product corresponds to such business for exclusively defining a product configuration which satisfies a specification required by a customer by selectively employing various specification items which have been previously set by a product designer and by combining the employed specification items with each other. Generally speaking, there are many possibilities that sales staffs and technical sales sections which are contacted to customers perform the above-explained business as a configuration designer.

In order that a configuration designer who is not a technical expert of a relevant product determines feasible combinations while the configuration designer confirms one by one complex restriction conditions related to a specification item by using a large amount of technical documents written on papers, a plenty of time is required, and in addition thereto, erroneous arrangements and inquiries for a product designer may occur, which may cause a factor of a cost-up matter.

Very recently, in order to improve efficiencies of such business, configuration designing/estimating operation aiding systems with employment of computers have been used, while these configuration designing/estimating operation aiding systems are referred to as configuration systems, or configurators, which are described in NIKKEI DIGITAL ENGINEERING, June in 2002, on page 32, NDE REPORT: "Reduction in estimation steps of product having complex configuration by Hitachi."

Conventional configurators can select specification items within a previously set range for the specification items. Moreover, there are many possibilities that non-standard discrete specifications outside the expected range are contained in such specifications required by customers for ordered products such as industrial appliances. In such a case that since there is no selection branch which is fitted to the required specification, configuration designing works cannot be carried out in the configurators. As a result, the investigations must be required for the product designers, so that it is not possible to avoid that a total step number of the product designers is increased, and lead times are extended.

Specification values available for specification items cannot be always and independently set, but own mutual relationships. When a certain specification item is selected and a specification value thereof is determined, there are some cases that specification values of other specification items are restricted. In particular, a very heavy work load of checking this restriction relationship has been given to configuration designers as to products whose component quantities are large and whose specification items are large.

SUMMARY OF THE INVENTION

The present invention has been made to solve the above-described problem, and has an object that in a product configuration design aiding system, the aiding system aids that a configuration designer can easily perform the configuration designing operation while following a restriction condition of a specification value of a specification item.

Also, when a product cannot be constructed in accordance with a request of a customer, the product configuration design aiding system aids to conduct such a specification which keeps the restriction condition of the specification value of the specification item by providing a substitution idea and a comparison.

The product configuration design aiding system of the present invention corresponds to such a system that while a specification item is determined every product, since a specification value is set to the specification item, a configuration designing operation of a product specification is carried out by a computer. Then, while a restriction condition available for a specification value with respect to a specification item has been described in a specification configuration information database, a configuration designing screen for inputting a specification value with respect to a specification item is produced based upon this restriction condition, and the produced configuration designing screen is displayed so as to accept an input. As a consequence, the specification setting operation capable of following the restriction condition can be carried out. Also, such a specification item which is not entered is automatically set by the system based upon a rule. Furthermore, when a configuration designer inputs a specification value which cannot satisfy the restriction condition with respect to a certain specification item, the system seeks a combination available for specification values of other specification items, and provides the sought result on a screen.

In accordance with the product configuration design aiding system of the present invention, a major portion of engineering works given to the product designer and the configuration designer can be systematically processed, and since the specifications are conducted to the range of the standard specifications, the product cost can be reduced. Also, a discrimination as to whether the designing operation is allowable, or not can be clearly established based upon the information for accepting the non-standard specifications, so that reductions in work loads given to the product designer can be expected. Further, even when the non-standard specification is entered, the estimation as to the appointed delivery date and also the price can be quickly answered. As a result, reductions in losing of ordering chances may be expected.

When a new machine sort and a new specification are released, at the same time, the specification configuration information can be updated and can be used in the product configuration design aiding system. As a result, there is no delay in starting of a marketing schedule, and losing of marketing chances can be reduced.

In accordance with the present invention, the product configuration design aiding system can aid that the configuration designer can easily perform the configuration designing operation while following the restriction condition of the specification value of the specification item. Also, when the product cannot be constructed in accordance with the request of the customer, the product configuration design aiding system can aid to conduct such a specification which keeps the restriction condition of the specification value of the specification item by providing the substitution idea and the comparison.

Other objects, features and advantages of the invention will become apparent from the following description of the embodiments of the invention taken in conjunction with the accompanying drawings.

BRIEF DESCRIPTION OF THE DRAWINGS

FIG. 3 is a diagram for indicating an example of a specification item table.

FIG. 4 is a diagram for representing an example of a restriction condition table.

FIG. 5 is a diagram for indicating an example of a specification arranging information table.

FIG. 6 is a diagram for indicating an example of a specification item setting screen (No. 1).

FIG. 7 is a diagram for showing an example of both a restriction relationship of a specification value and an editing screen as to various attributes.

FIG. 8 is a diagram for indicating an example of a specification arranging information setting screen.

FIG. 9 is a diagram for showing an example of a subject information table.

FIG. 10 is a diagram for indicating an example of a subject information setting screen.

FIG. 19 is a diagram for showing an example of a specification substitution idea providing screen.

FIG. 20 is a diagram for indicating an example as to a menu screen of a specification editing work.

FIG. 21 is a diagram for showing an example as to a designing calculation formula editing screen of a specification value.

FIG. 22 is a diagram for indicating another example as to a designing calculation formula editing screen of a specification value.

FIG. 23 is a diagram or indicating an example as to a various attribute editing screen of a specification value.

FIG. 24 is a diagram for showing an example as to a calculation condition editing screen of a specification value.

FIG. 25 is a diagram or indicating another example as to a various attribute editing screen of a specification value.

FIG. 26 is a diagram for showing an example as to a menu screen of a configuration designing work.

FIG. 27 is a diagram for indicating an example of a specification selecting screen.

FIG. 28 is a diagram for showing an example of a subject information screen.

FIG. 31 is a diagram for indicating an example of a subject list screen.

Figure 1:
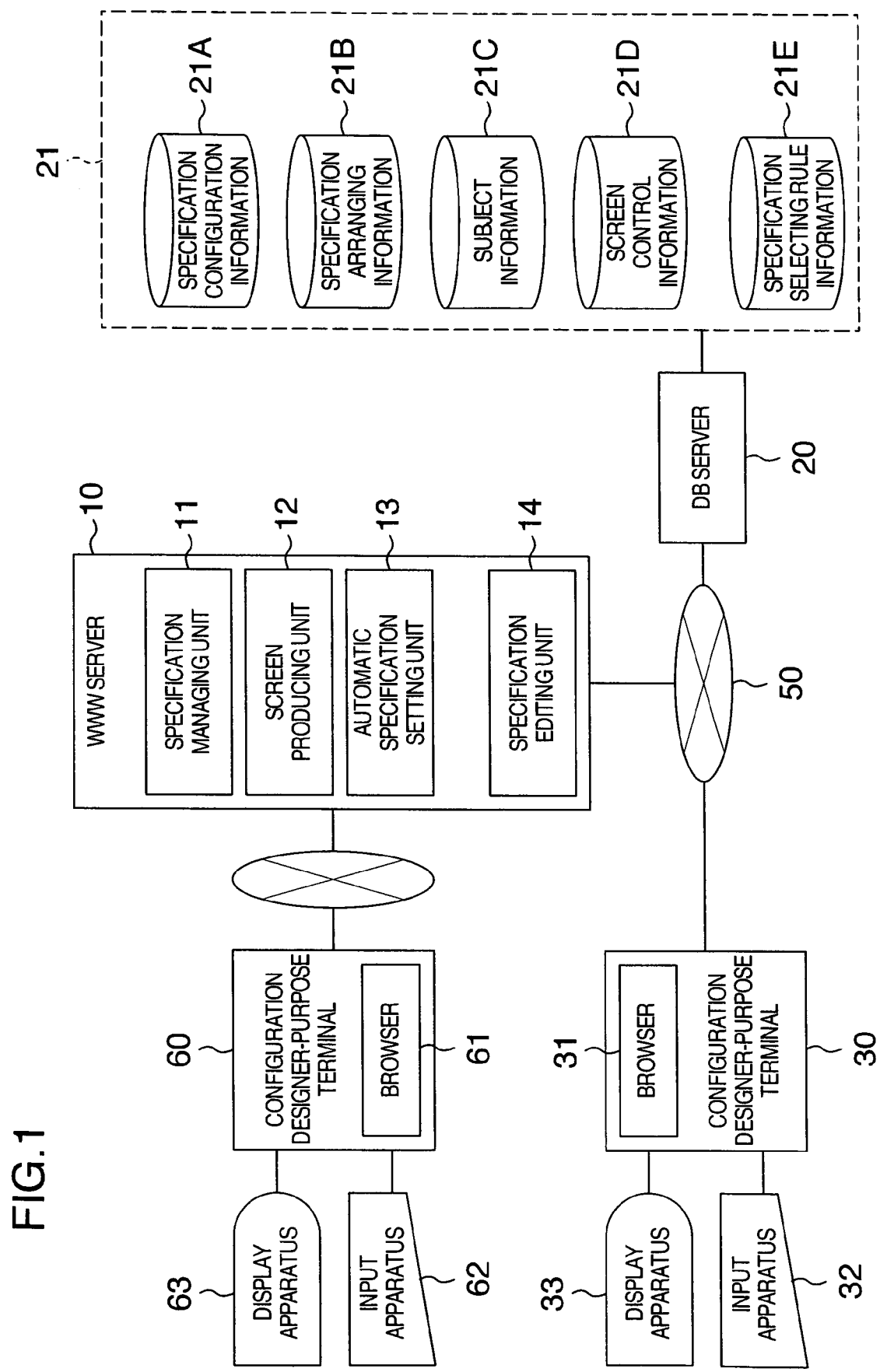
FIG. 1 is a system structural diagram of a product configuration design aiding system according to the present invention.

DETAILED DESCRIPTION OF THE EMBODIMENTS (1) System Arrangement of Product Configuration Design Aiding System A system arrangement of a product configuration design aiding system according to the present invention will now be explained in FIG. 1. As indicated in FIG. 1, both an information processing system on the side of a configuration designer and another information processing system on the side of a product designer have been contained in the product configuration design aiding system according to the present invention.

A product designer determines a specification which constitutes a base of a product, and designs items of this specification and available specification values, and also, designs a restriction condition which is caused by selecting a specification item and by a set specification value. As this product designer, such a designer and the like are supposed who are mainly working in a product manufacturing factory, and the like.

On the other, a configuration designer corresponds to such a person who has a role of analyzing a specification required by a customer, and a role of setting a specification value fitted to the requirement of the customer with respect to each of the specification items, while paying his attention to a restriction condition. As this configuration designer, a sales staff and the like are supposed who are working on the customer side.

In the information processing system on the side of the configuration designer, one pieces, or more pieces of user terminals 60 (will be referred to as "configuration designer-purpose terminal 60" hereinafter) have been contained, and the configuration designer-purpose terminals 60 correspond to WWW (World Wide Web) clients connected to the Internet. This configuration designer-purpose terminal 60 corresponds to such an information processing apparatus having a normal hardware arrangement capable of executing a program in response to an input by a user, and the like. Various sorts of programs have been previously installed in a hard disk built in the information processing apparatus. As these programs, a browser 61, an OS (Operation System), and the like have been previously installed in order to utilize WWW. It should be noted that a display apparatus 63, and an input apparatus 62 (mouse, keyboard etc.) have been connected to this configuration designer-purpose terminal 60, while a series of Web pages (will be explained later) and the like for aiding configuration designing operations of products are displayed on the display apparatus 63.

On the other hand, the information processing system on the side of the product designer has contained therein a WWW server 10 connected to the Internet, a database server 20, one pieces, or more pieces of user terminals 30, a LAN (Local Area Network) 50, and the like. The LAN 50 has mutually connected these servers and user terminals to each other.

The WWW server 10 corresponds to such an information processing apparatus having a normal hardware arrangement capable of loading a program on a memory and capable of executing the loaded program in response to an externally supplied instruction. Various sorts of software have been installed in a hard disk built in this information processing apparatus, while these various sorts of software correspond to httpd (Hyper Text Transfer Protocol Daemon) by which when a request from a browser is accepted, a usable file is applied to the browser; a CGI (Common Gateway Interface) script for processing data from httpd; a configuration design aiding program which is initiated by the CGI script; an OS (Operation System), and the like. Furthermore, an HTML document has been stored in the hard disk in order to display a series of Web pages (will be explained later) of a configurator site on the display apparatus 63 of the configuration designer-purpose terminal 60.

As functional structures which are realized by these sorts of software and of hardware such as a CPU, the WWW server 10 has contained the below-mentioned units: The WWW server 10 has contained:

(i) a specification managing unit 11 which selects a specification item of a configuration designer, holds therein information of input data of this specification value, and updates the held information;

(ii) a screen producing unit 12 which produces a result thereof based upon the information held in the specification managing unit 11, and then, provides the produced result as a configuration designing screen to the configuration designer;

(iii) an automatic specification setting unit 13 which performs a seeking operation so as to provide a specification capable of satisfying a restriction condition when a portion which is not entered by the configuration designer is automatically selected, and an input by the configuration designer is deviated from the specification; and (iv) a specification editing unit 14 which is used in such a case that a product designer produces a specification item and sets both available specification values thereof and a restriction condition to a specification configuration information database 21A, and the product designer edits a specification item described in a specification arranging information database 21B.

On the other hand, the database server 20 corresponds to such an information processing apparatus having a normal hardware structure capable of executing a program in response to an externally supplied instruction. In a hard disk built in the information processing apparatus, a database management system program in which a database process operation such as a database retrieving operation is defined, a data communication control program, an OS, and the like have been installed. Then, this database server 20 owns an external storage apparatus 21 into which databases 21A to 21E have been stored, while these databases 21A to 21E should be processed by the database processing operation of the database management system program.

In the specification configuration information database 21A, specification items and specification values of products, and restriction conditions thereof have been registered.

In the specification arranging information database 21B, unit prices and lead times for deliveries have been registered which are related to the specification items and the specification values of the products. A lead time implies a technical term used in production engineering, which defines a time period from an order up to a delivery. This lead time may be sometimes and simply abbreviated as an "LT" hereinafter.

In the subject information database 21C, configuration design results obtained in the past and under acquisition, and information related to customers and subjects have been registered.

In the screen control information database 21D, display positions, input methods, and the like as to the respective specification items on the configuration designing screen has been registered.

In the specification selecting rule information database 21E, such rules have been registered which are used in the case that specification values are determined from default values and restriction conditions with respect to such specification items which have not been inputted.

The product designer-purpose terminal 30 corresponds to such an information processing apparatus having a normal hardware arrangement capable of executing a program in response to an input by a user, and the like. Various sorts of programs have been previously installed in a hard disk built in the information processing apparatus. As these programs, a browser 31, an OS (Operation System), and the like have been previously installed in order to utilize WWW. It should also be noted that a display apparatus 33, and an input apparatus 32 (mouse, keyboard etc.) have been connected to this product designer-purpose terminal 30, while a series of Web pages and the like for aiding configuration designing operations of products are displayed on the display apparatus 33.

Figure 2:
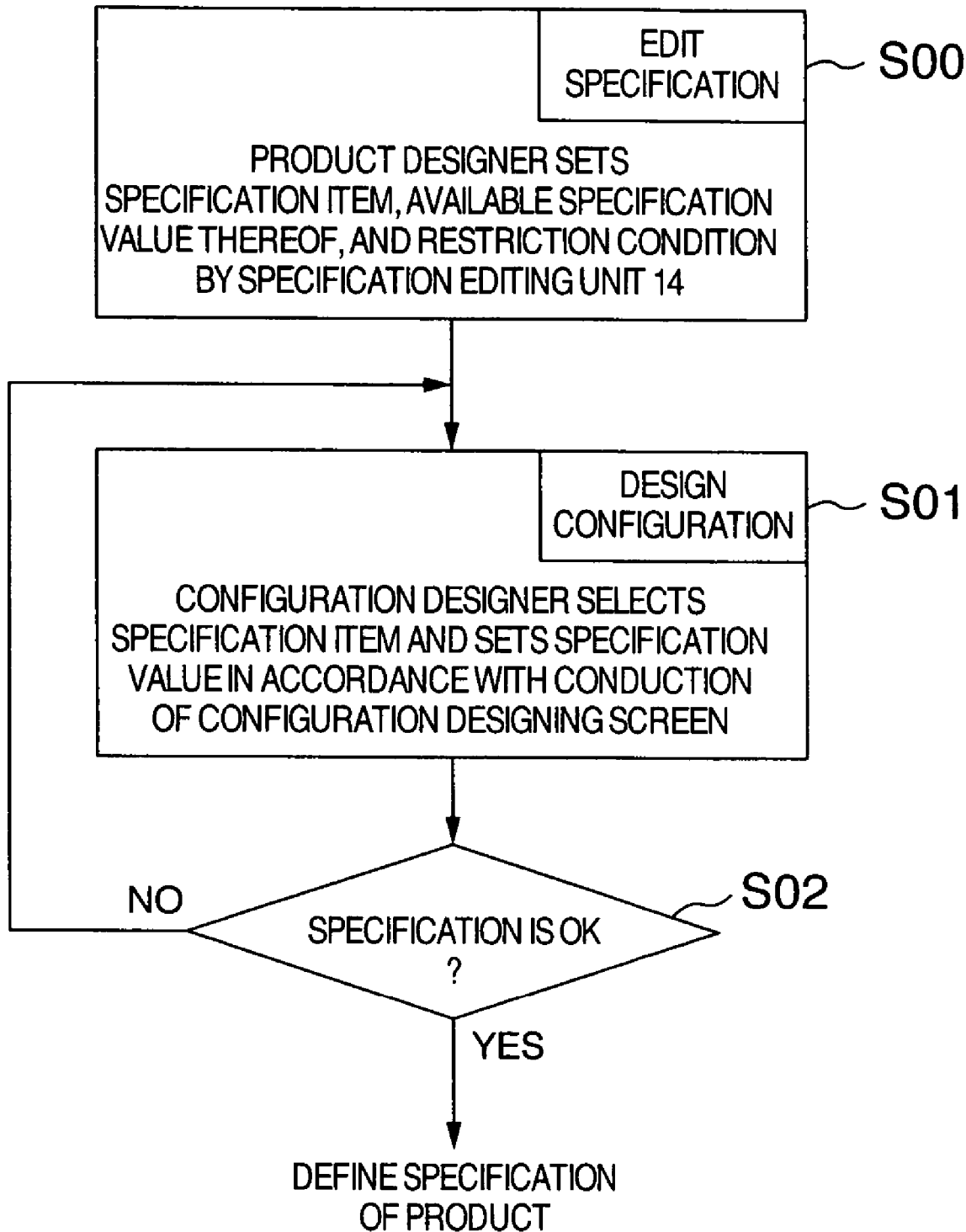
FIG. 2 is a flow chart for describing a summarized sequential operation of a product designing operation by the product configuration design aiding system of the present invention.

(2) Summary of Sequentially Processing Operations of Product Configuration Design Aiding System First, referring to FIG. 2, a summary of sequentially processing operations of product designing operations by the product configuration design aiding system of the present invention will now be described. FIG. 2 is a flow chart for explaining the summary of the sequentially processing operations of the product designing operations by the product configuration design aiding system of the present invention.

First, a designer of a product sets a specification item, available specification values thereof, and a restriction condition by using the specification editing unit 14 (step of product designing operation: S00). The set information is stored in the specification configuration information database 21A.

A "specification item" corresponds to a basic item as to a specification which is determined with respect to each of products, and a "specification value" corresponds to a value which is available by this specification item. An available specification value with respect to one specification item may correspond to one specification value, and also may correspond to a plurality of specification values. Normally, there are plural specification items as to a product. While these plural specification items are not independently present, only when a certain specification item takes a certain specification value, other specification items may take this specification value, or may not take this specification value. As explained above, since a specification item and a specification value of this specification item are set, specification values which are available by another specification item are restricted. This will be referred to as a "restriction condition."

When the designer of the product determines the specification item, the available specification values thereof, and the restriction condition, a base model of the product may be determined. In order to deliver the product in response to a request of a customer, a specification item must be concretely selected based upon this base model, specification values of this selected specification item must be inputted, and then, all of specifications as to the product must be determined. As a consequence, a configuration designer subsequently selects a specification item and sets a specification value in accordance with a conduction of a configuration design screen (step of configuration designing operation: S01).

On the configuration designing screen, an input item is conducted in order to satisfy the restriction condition determined by the product designer. In the below-mentioned descriptions, such a specification which satisfies a restriction condition within a base model determined by a product designer will be referred to as a "standard specification", whereas another specification which does not satisfy the restriction condition will be referred to as a "non-standard specification." As will be explained later, the product configuration design aiding system of the present invention may also own the following function. That is, when a configuration designer inputs a specification value in order to become a non-standard specification, the product configuration design aiding system seeks a proper substitution item by which the non-standard specification is automatically changed into a standard specification, and provides the proper substitution item to the configuration item. Then, the above-described operations are repeatedly executed until a specification is defined (S02).

(3) Processing Operations of Product Design

Next, a description is made of sequential processing operations in such a case that a product designer designs a product by using the product configuration design aiding system of the present invention with reference to FIG. 3 to FIG. 8.

FIG. 3 is a diagram for indicating an example of a specification item table. FIG. 4 is a diagram for representing an example of a restriction condition table. FIG. 5 is a diagram for indicating an example of a specification arranging information table. FIG. 6 is a diagram for indicating an example of a specification item setting screen (No. 1). FIG. 7 is a diagram for indicating an example of a restriction condition setting screen. FIG. 8 is a diagram for indicating an example of a specification arranging information setting screen.

First, at a step for designing a product, a setting operation of the specification configuration information database 21A is carried out.

The product designer executes a specification editing operation as to either a new specification item or an existing specification item, or as to a specification value. At this time, first of all, when the browser 31 is initiated on the product designer-purpose terminal 30 and a URL (Uniform Resource Locaters) of a Web document of a configurator site is entered via the known user identifying means, a transmission request of the Web document indicated by this URL is transmitted from the browser 31 on the product designer-purpose terminal 30 to the WWW server 10. On the WWW server 10, the httpd retrieves the Web document designated by this request from a document tree, and resends the retrieved Web document to the product designer-purpose terminal 30. As a result, a top page of a product information management site is displayed on the display apparatus 33 of the product designer-purpose terminal 30.

As indicated in FIG. 20, as a menu when the product design information is edited, such selection items as a subject product 201, a specification item 202, and a specification group 203 are displayed on a screen 200 corresponding to the top page of this product information management site. Also, there is a button 204 used to accomplish the present editing operation. When the product designer selects the specification item 202 so as to edit the specification item, a screen used to select a specification editing subject is displayed.

FIG. 6 is an example of a screen used to select a specification editing subject. A list 1301 of specification items is displayed on specification items setting screen 1300 of FIG. 6. This screen is produced from the specification item table 301 shown in FIG. 3.

A field of a specification item 302 stores both codes and names indicative of specifications of a product. A field of a specification value 303 stores codes and names of selectable specification values as to the relevant specification item. A field of an application 304 stores codes of product types capable of selecting the relevant specification value. That is to say, the fields represent that both the specification items and the specification values have been determined with respect to the product types which are used as the bases for setting the specifications.

A field of a restriction 305 stores a flag for indicating as to whether or not a restriction condition is present in order to apply the relevant specification value to the relevant application destination. If the restriction 305 corresponds to "NO" (noted that "YES" is indicated as mark "○", and "NO" is indicated as "no mark" in this drawing), then this restriction 305 represents that both the relevant specification item and the relevant specification value can be applied to the product described in the application destination without any restriction.

(4) Registration of Restriction Condition

In order to edit the existing specification item, when the product designer clicks either the specification item column 1302 or the specification value column 1303 of the list indicated in FIG. 6, or clicks an add button 1306 for adding a new specification item, a restriction condition setting screen 1310 shown in FIG. 7 is displayed. The restriction condition setting screen 1310 is displayed based upon the restriction condition table 311 shown in FIG. 4.

A field of a specification item 312 stores an item indicative of a specification of a product. A field of a specification value 313 stores specification values which are selectable as to the relevant specification item. A field of an application 317 stores codes of product types capable of selecting the relevant specification value. A field of a restriction 318 stores other specification items and specification values thereof, which constitute a restriction condition used so as to apply the relevant specification value to the relevant application destination.

A restriction relationship 319 defines a relationship with respect to either specification items or specification values, which constitute the restriction specification, by way of logic operators such as AND, OR, NOT, and so on. As other expression methods of these logic operators, "&", "/", "−", "1", "2", "3", and the like may be employed.

An application level 1318 contained in the restriction condition setting screen 1310 shown in FIG. 7 corresponds to such a flag which defines as to whether or not the relevant specification value for the application destination 1317 can be applied, or defines a degree of application recommendation. In this case, for instance, such sections are employed, namely, "A" essential section; "B" recommendable section; "C" applicable section; "D" application considerable section; and "E" not applicable section are used. As the above-described flag, any types of flags may be employed which may be sufficiently understood by the product designer and the system side, and other symbols of "●", "X", "▲", "1", "2", "3", and the like may be alternatively employed. Also, specification values 1313 to 1316 correspond to specification values which are selectable in the relevant specification item. An application destination 1317 corresponds to a product type to which the relevant specification value can be applied. A restriction 1319 corresponds to other specification items and specification values, which constitute the restriction condition under which the specification values 1313 to 1316 are applied. A restriction relationship symbol 1320 corresponds to a logic operator for indicating a relationship with respect to either the specification items or the specification values, which constitute the restriction condition.

In the example of the restriction condition table 311 of FIG. 4, for example, a first record indicates that in a product "XX1", when such a specification value "code: 1002A00, name: 15 kW" of a specification item "1002A" is applied, there is no restriction condition in this case.

Also, a second records indicates that in the product "XX1", when the specification item corresponds to "1010A" and the specification value corresponds to "1010A01", such a specification value "code: 1002A02, name: 20 kW" of the specification item "1002A" can be selected.

Further, a third record indicates that in the product "XX1", when the specification item corresponds to "1010A" and the specification value corresponds to "1010A01", either a specification item is "2002A" and a specification value is "2002A00" or a specification item is "2002A" and a specification value is "2002A01", such a specification value "code: 1002A04, name: 25 kW" of the specification item "1002A" can be selected.

In the case that a specification value is wanted to be increased as to the relevant specification item, a specification value add button 1321 of FIG. 7 is clicked. One column is added to the lowermost portion of the restriction condition table 1311, so that a code, a name, an application, and a restriction condition may be defined. Also, in such a case that a restriction condition of a specification value is changed, a restriction change button 1322 is clicked.

In the case that both a specification item and a specification value are wanted to be increased which own a restriction relationship, a restriction add button 1323 is clicked. A sub-screen having a table whose format is equal to the format of the specification item list 1301 is displayed, and then, either a specification item or a specification value which are wanted to become subjects is selected on the sub-screen. In the case that a specification item is selected, columns whose quantity is equal to a total number of specification values owned by the relevant specification items are added to a right end of the restriction condition table 1311, and then, a code, and a name are described. In such a case that a specification value is selected, one column is added to the right end of the restriction condition table 1311, and then, a code and a name are described.

(5) Registration of Function Type

A method for setting another restriction condition with respect to either a specification item or a specification value will now be further explained with reference to FIG. 21. A specification item editing page 1330 corresponds to an example of a screen which is used to define such a specification item whose value is specified based upon a calculation formula. When a specification value 1332 of a specification item 1331 may be applied to an application destination 1317, a restriction 1333 has been defined.

Furthermore, a calculation flag 1336 has been applied with respect to a calculation condition 1335. This indicates such a condition that such a restriction relationship is defined by employing a code and a symbol indicative of an operator, while the restriction relationship is given by that the specification item 1332 may be exclusively calculated based upon a design calculation formula 1339 containing a specification value of another specification item 1335. The design calculation formula 1339 defines such a relationship that, for example, a value of a specification item (namely, "button number" of certain portion of product) is calculated by multiplying another specification item "4000B" determined by a request of a customer by 2. This relationship may be similarly applied to such a case that there are plural calculation condition specification items contained in a design calculation. Information as to the relationship between the operators and the codes, and the calculation orders is held by, for example, the reversed Polish formula which is known in the field.

(6) Registration of Design Calculation Formula with Application Condition

Referring now to FIG. 22, a description is made of another example as to a method of defining both a calculation condition and a design calculation formula. A screen 1340 indicates that the specification value 1332 of the specification item 1331 is applicable in the restriction 1333 when both another specification value "3500D02" and another specification value "1010A01" are selected, and in this case, are calculated based upon a design calculation formula 1339.

On the other hand, in a restriction 1333 a specification value 1341 is brought into such a condition which defines that the specification value 1341 is applicable when both another specification value "3500D01" and another specification value "1010A01" are selected, and in this case, is calculated based upon the design calculation formula 1339.

Referring to FIG. 23 and FIG. 24, an explanation is made of another example as to a method for defining a design calculation formula. A screen 1350 corresponds to a screen which defines a property of a specification item. A design calculation formula 1351 corresponds to an edit box which registers a formula. If a simple formula is used, then this simple formula is directly inputted. However, when such a formula which is coupled with a plurality of calculation conditions is described, an edit button 1352 is pushed, so that the screen 1350 is advanced to an edit screen 1360 shown in FIG. 24. A specification item 1362 of a calculation condition 1361 is pushed, so that the relevant code 1362 is displayed in a design calculation formula 1363. While this displayed code 1362 is utilized, a calculation formula is defined.

(7) Registration of Range Restriction

Referring now to FIG. 25, a description is made of another example as to a definition method in the case that when a specification value is given as a numeral value, a restriction is established in a range available for this given numeral value. As to the specification value 1332 of the specification item 1331, a range available in view of a design has been previously determined, and an arbitrary numeral value of a customer request is registered in this range.

A maximum value, or a minimum value is defined, or both the maximum value and the minimum value are defined. Also, such a definition is made that the relevant specification value may take only one of a plurality of discrete values. As a result, in a configuration design, such a check may be made that when a value not capable of satisfying the above-described range is inputted, an error occurs. As to the relevant specification item, a symbol indicative of a comparing operator "<" or "≦", ">" or "≧", "=" is indicated in a restriction relationship list box 1371, and then, a necessary symbol is selected. Alternatively, another example of the symbol, "LT(Less Than)", "LE(Less, or Equal)", "GT(Greater Than)", "GE (Greater, or Equal)", "EQ", and the like may be used. Either a constant or a design calculation formula is defined in a formula 1372. In such a case that the range for the specification values which are available for the specification item 1331 is varied, depending upon the value of another specification item 1335, either the maximum or the minimum value, or either the available discrete values or the combined values are defined by employing a formula which involves the specification item 1335.

In the present invention, since the restriction relationships in the specification configuration information have been held in the list forms, the below-mentioned functions can be readily constituted.

(8) Registration of Arranging Information

When an arranging information button 1325 of FIG. 7 is clicked, such a specification arranging information setting screen 1380 for editing a specification arranging information table shown in FIG. 8 is displayed. In this example, specification arranging information corresponds to such an information for collecting factors which should be considered when a product is manufactured, e.g., lead times, unit prices, and the like in order to manufacture the product based upon a specifications item and a specification value thereof must be considered.

A specification arranging information list 1381 corresponds to a list of arranging information as to each of specification items and specification values thereof. The specification arranging information list 1381 is produced based upon the specification arranging information table 331 shown in FIG. 5. A field of a specification value 332 stores a code and a name of a specification value which constitutes a subject. A field of a valid term 334 of a specification value stores such a term that this specification value can be selected. In the case that a configuration is designed, when the present time is located before, or after this valid term 334, the relevant specification does not constitute a selectable subject. A field of a unit price 335 corresponds to a unit price which is employed in an estimation calculation when a configuration is designed. "¥0" indicates that even if the relevant specification value is selected, no adverse influence is produced, namely, it is involved in a base price. A field of this term 336 corresponds to such a term that the relevant unit price may be used, and when a configuration designing time is present before, or after this term 336, no estimation can be carried out. A field of a lead time 337 stores a delivery lead time as to either a product or a part, which may satisfy a specification value. A field of this term 338 corresponds to a time period during which the relevant lead time may be used, and when a configuration designing time is present before, or after this term 338, a delivery time cannot be answered.

Although such a screen for defining a specification item is no shown in the drawing, both an input column (code and name) of the specification item and a specification value (code and name) are inputted. Also, a specification type is defined.

The specification type corresponds to a flag indicating how the relevant specification item owns a specification value. A "value type" indicates that a value (numeral value and character string) is directly inputted when a configuration is designed. A "selection type" indicates that a specification value is selected from a plurality of specification values. A "range type" indicates that while a combination between an upper limit numeral value and a lower limit numeral value is used as a specification value, this specification value is selected from a plurality of specification values. A "function type" indicates that a specification value is defined by a function (calculation formula) having another function as an argument.

(9) Teeth-Lost-Condition Management

When a specification item indicative of a specific portion (function module) is selected by a combination of plural specification items, since specification items selected in a matrix indicative of total specification item combinations are mapped, such portions having function modules corresponding to the combined specifications items are displayed under a teeth-lost-condition. As a result, a required specification of a function module which should be subsequently designed can be clarified.

(10) Standardization Analysis

Furthermore, since actually requested results (total quantity) of non-standard specifications recorded in the subject information database 21C are displayed in an overlap manner, combinations among required specifications where market needs are made may be clarified, and thereafter, combinations among specifications which should be designed as standard specifications may be clarified.

(11) Processing Operation of Configuration Design

Next, a description is made of processing operations of configuration designs by the product configuration design aiding system of the present invention with reference to FIG. 9 to FIG. 19.

A configuration designer forms a new subject, or such a subject which has already been handled by way of the above-described specification editing means, and performs a configuration designing operation by referring to the updated specification configuration information database 21A, and the updated specification arranging information database 21B.

(12) Specification Conduction by Configuration Designing Screen

First, an explanation is made of such a stage that the configuration designer performs a configuration designing operation by conducting a specification by the configuration designing screen with reference to FIG. 9 to FIG. 12.

FIG. 9 is a diagram for showing an example of a subject information table.

FIG. 10 is a diagram for indicating an example of a subject information setting screen.

Figures 11, 13:
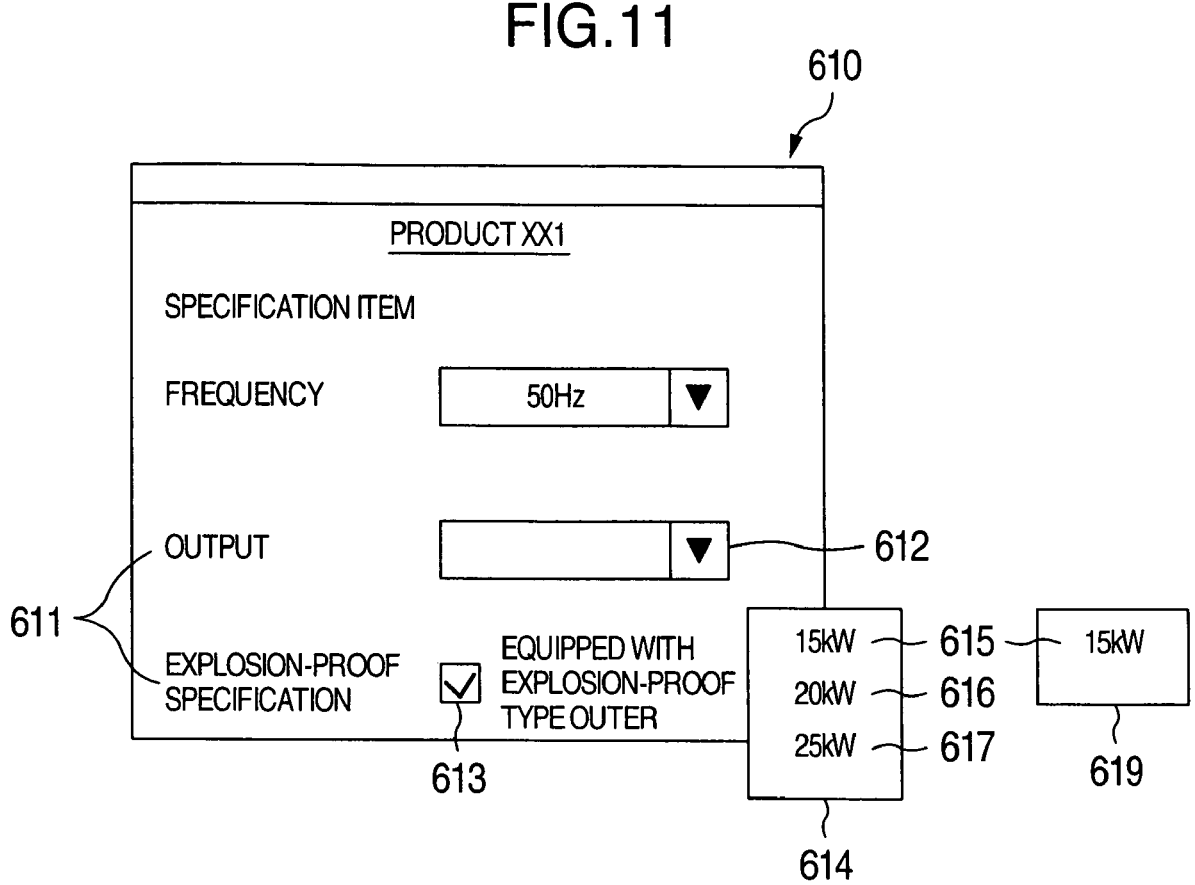
FIG. 11 is a diagram for showing an example of a configuration designing screen (No. 1).
FIG. 13 is a flow chart for showing one example of a specification selecting rule information table.

FIG. 11 is a diagram for showing an example of a configuration designing screen (No. 1).

Figure 12:
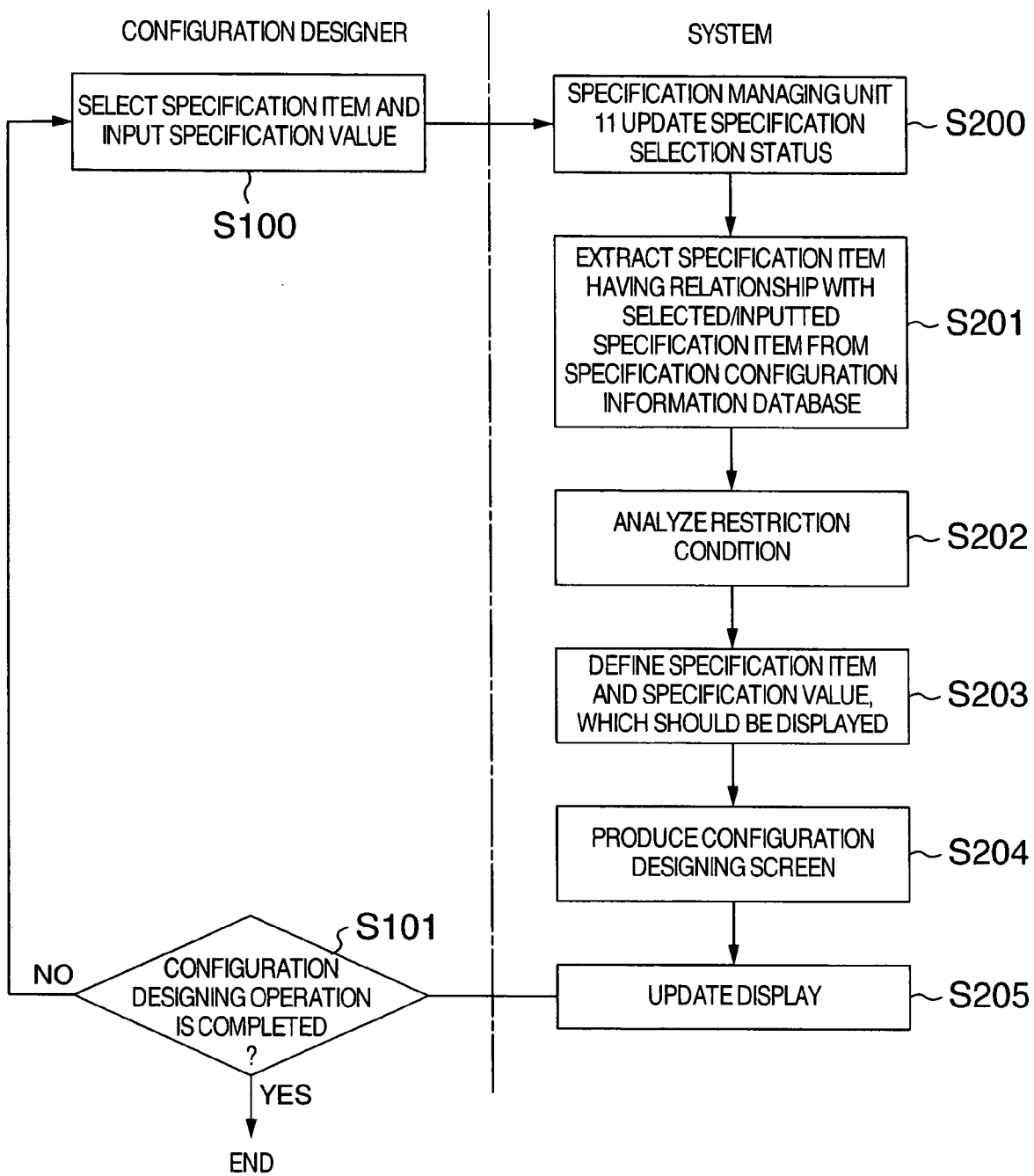
FIG. 12 is a flow chart for indicating a process sequential operation executed in the case that a configuration designing operation is carried out by a conduction based upon the configuration designing screen.

FIG. 12 is a flow chart for indicating a process sequential operation executed in the case that a configuration design is carried out by a conduction based upon the configuration designing screen.

When the configuration designer initiates the browser 61 on the configuration designer-purpose terminal 60, and inputs a URL (Uniform Resource Locaters) of a Web document of a configurator site via the known user identifying means, a transmission request of the Web document indicated by this URL is transmitted from the browser 61 on the configuration designer-purpose terminal 60 to the WWW server 10. On the WWW server 10, the httpd retrieves the Web document designated by this request from a document tree, and resends the retrieved Web document to the configuration designer-purpose terminal 60. As a result, a top page of a product configuration design aiding site on the display apparatus 63 of the configuration designer-purpose terminal 60.

As shown in FIG. 26, a menu of configuration designing business is displayed on a top page 500 of this configurator site in the top page of the product configuration design aiding site. In the case that anew subject is designed, a new subject button 501 is selected. In order to call a list of existing subjects shown in FIG. 31, a subject list button 502 is selected.

The configuration designer selects either a continuation of the existing subject or the new subject, and then, commences the configuration designing process operation.

When the configuration designer selects the continuation of the existing subject so as to call the list of the existing subjects, as shown in FIG. 10, a subject list 1601 is displayed on a subject information setting screen 1600. The subject list 1601 is produced based upon a subject information table 601 shown in FIG. 9.

A field of a management number 602 corresponds to a field used by that the configuration designer stores a number for identifying a subject. Such a management number on a sales business as an estimation number and an order number may be applied to the management number 602. A field of a customer code and a name 603 stores data used to identify a customer of the relevant subject. A field of a product type 604 corresponds to a basic type of a product which constitutes a configuration design subject of the relevant subject, and stores a code of a base which is described in an application of specification configuration information. A field of a number 605 stores a quantity of a product which is requested by a customer. A field of an appointed delivery data 606 stores an appointed delivery date requested by a customer as to the relevant subject. A field of a price 607 stores an upper limit price requested by a customer. A field of a specification 608 stores an identification flag for identifying as to whether the relevant subject is arranged by only a standard specification, or arranged by containing a non-standard specification. A field of a status 609 stores a code indicative of a present status of a subject, namely, either a delay or a possibility of a delay occurs in a configuration design schedule of the relevant subject.

Although not shown in the drawing, such a result that a configuration designing operation as to the relevant subject was carried out in the past by being linked to a management number of a subject information table has been stored in another table of the subject information database 21C as a specification selection history.

Next, a configuration designing screen 610 will now be explained with reference to FIG. 11.

For instance, in a configuration designing operation of a product "XX1", when the configuration designer selects a specification item and/or sets a specification value thereof, the configuration designer performs the configuration designing operation by way of a configuration designing screen 610. A specification item 611 to be selected, and either a list box 612 or a check box 613 which are used to select a specification value are displayed on the configuration designing screen 610. When the configuration designer clicks the list box 612 so as to select the specification, a list 614 is displayed. Then, the configuration designer selects a proper specification value based upon a request of a customer from this list 614. The list 614 is produced with reference to a specification configuration information database.

It is now assumed that a restriction relationship shown in the restriction condition table 311 indicated in FIG. 4 has been defined with respect to specification values 615 to 617 which may be available for a specification item "code: 1002A, name: output", a specification configuration of the product XX1 is carried out. At this time, specification values are changed as follows, which can be inputted by the list box into an input column of a specification value of the specification item "code: 1002A, name: output" in accordance with values of specification values of other specification items:

That is to say, as to a specification value 615 "15 kW", since there is no restriction relationship and the specification value can be applied, this specification value is continuously displayed in the list and may be selected. However, a specific value 616 "20 kW" is displayed and may be selected only when a specific value of a specific item "1010A" corresponds to "1010A01." Furthermore, another specification value 617 "25 kW" is displayed and may be selected when the specification value of the specification item "1010A" corresponds to "1010A01", and further when the specification value of the specification item "2002A" corresponds to "2002A00", or the specification value of the specification item "2002A" corresponds to "2002A01." Also, since another specification value "40 kW" is not defined to be applied to the product XX1, this specification value is not displayed.

A configuration design is related to the product XX1, and further, if the configuration designer does not select that the specification value of the specification item "1010A" corresponds to "1010A01", then a list is displayed as a list 619, and there is no way other that the configuration designer selects the specification value 615. As a consequence, since the configuration designer inputs the specification items in accordance with the conduction by the configuration designing screen provided by the system, it is possible to avoid the erroneous selection. The above-explained process operations are repeatedly carried out in an interactive manner, so that the configuration designing operation of the relevant product may be accomplished.

The above-explained process operations are described with reference to a flow chart of FIG. 12.

That is, in the flow chart, the configuration designer firstly selects a certain specification item, or inputs a specification value thereof (S100). On the system side, the specification managing unit 11 updates a specification selecting status (namely, status arranged by pair of specification item and specification value thereof) (S200).

Next, the specification managing unit 11 extracts a specification item related to the selected and inputted specification item from the specification configuration information database 21A (S201), and analyzes a restriction condition of this specification item (S202). Then, the specification managing unit 11 defines both a specification items and a specification value, which should be displayed (S203). The screen producing unit 12 produces a configuration designing screen (S204), and updates the display (S205).

When the configuration designing operation of the specification is not yet completed by the configuration designer, the process operation is returned to the step S100 in which this process operation is repeatedly carried out until the configuration designing operation of the specification is accomplished (S101).

FIG. 27 is an example of a screen used to select a specification item. In the screen 720, a machine sort 721 corresponds to a machine sort and a type, which should be configuration-designed. A specification group 722 corresponds to a list box which is used to select a specification group to be edited. A button 723 is employed so as to turn over the specification groups to be displayed on the screen 720 along forward/backward directions. A subject registration button 724 corresponds to a button used to transfer the relevant subject to such a subject information screen shown in FIG. 28.

When the specification group 722 is designated in the specification group 722, both a specification item 725 allocated to this specification group and either a list box 726 or an edit box which are used to select this specification value are displayed. When the list box 726 is clicked in order to select a specification value, only such specification values capable of satisfying the restriction condition among the specification values are displayed in the list box. The configuration designer inputs from this list box, a proper specification value capable of satisfying a customer request. Also, the configuration designer inputs a numeral value capable of satisfying the customer request in the list box 726.

(13) Automatic Setting Process Operation by System

Figure 14:
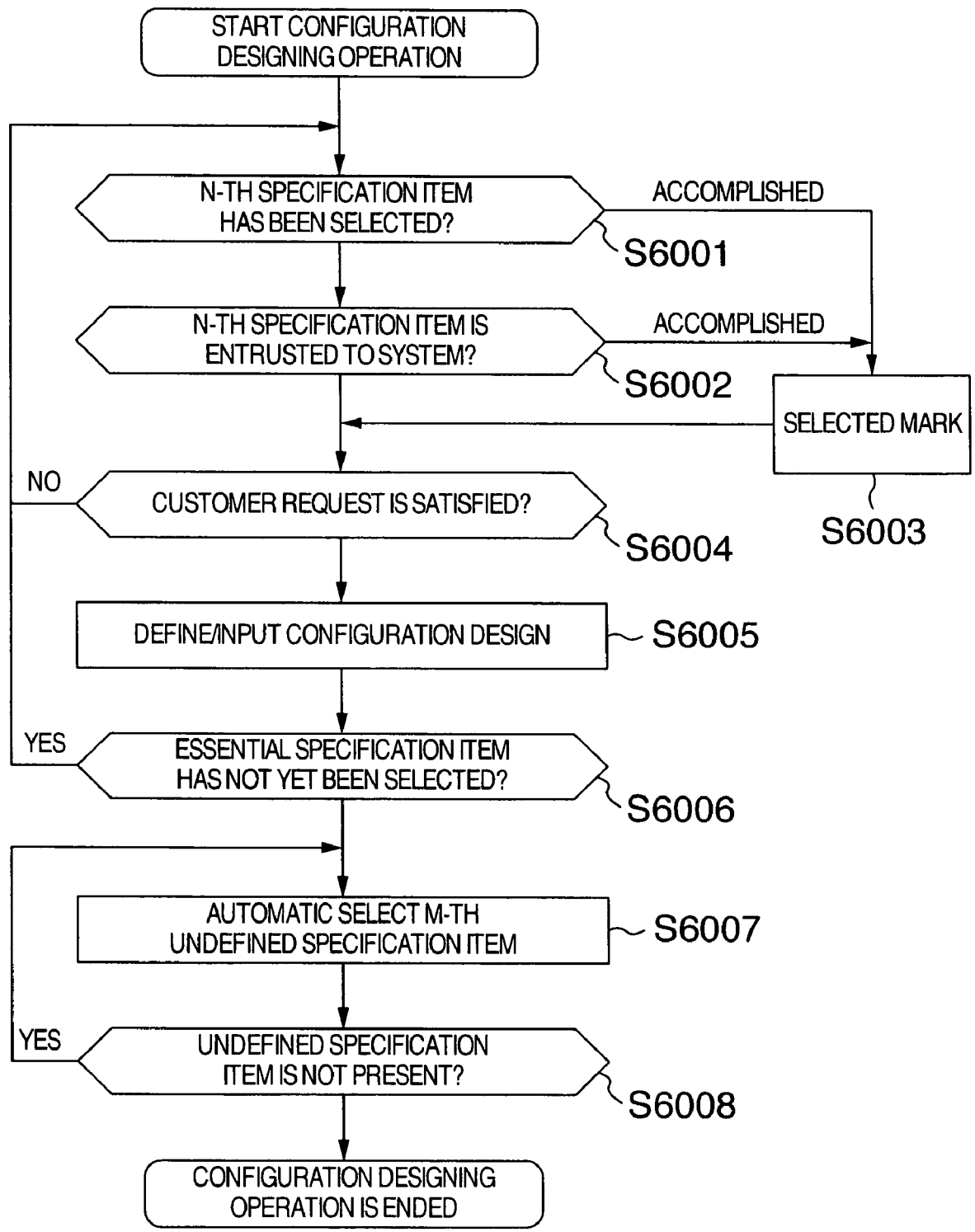
FIG. 14 is a flow chart for explaining a process sequential operation when a specification configuration is automatically set.
Figures 15, 16:
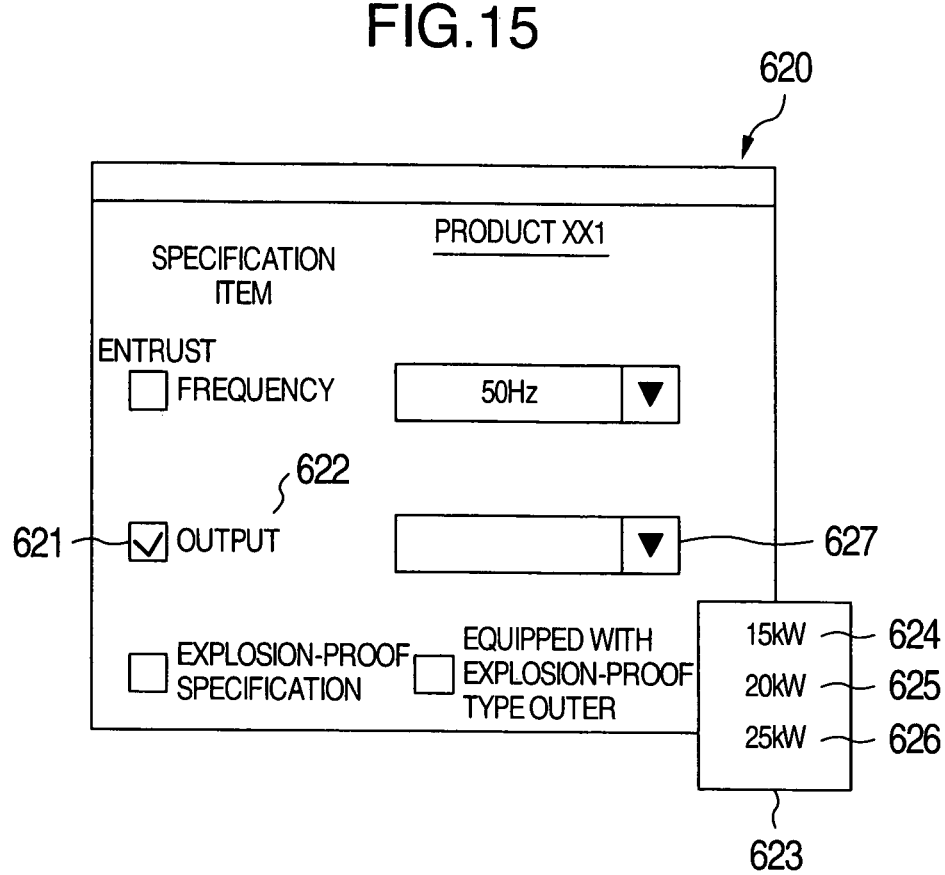
FIG. 15 is a diagram for showing an example a configuration designing screen (No. 2).
FIG. 16 is a diagram for presenting an example of a specification item setting screen (No. 2).

Next, a description is made of process operations for automatically performing a specification configuration in a configuration designing stage of the product configuration design aiding system with reference to FIG. 13 to FIG. 15.

FIG. 13 is a flow chart for showing one example of a specification selecting rule information table. FIG. 14 is a flow chart for explaining a process sequential operation when a specification configuration is automatically set. FIG. 15 is a diagram for indicating one example of a configuration designing screen (No. 1).

The image producing unit 12 produces a configuration designing screen in accordance with the data of the screen control information database 21D, and displays the produced configuration designing screen. As previously explained, the configuration designer can select a specification item within the range of the standard specification in accordance with the conduction of the structural design screen, and can set a specification value.

However, while a very large number of input items are present depending upon products, even if specification items are selected on a computer, a large number of processing steps are required to be executed. As a consequence, only an important specification item for a customer and only such a specific item which constitutes an external restriction such as an installation environment of a product may be alternatively selected, and another selection may be alternatively made as to other specification items which should be judged by the system.

In the system, while such an automatic setting information table as shown in FIG. 13 has been previously held in the specification selecting rule information database 21E, both the specification item and the specification value thereof are set based upon this automatic setting information table.

For instance, when a specific item "output" is not inputted, a specification value "15 kW" is set as a default. Also, as to a specific item "powered appliance", while referring to the specification arranging information table 21B in accordance with the rule, a specification value is set by considering a price (first priority) and a lead time (second priority). As previously explained, the rule has been set in such a manner that an optimum specific value may be selected, depending upon a characteristic of a specification item and a nature of a customer.

Subsequently, sequential process operations as to the automatic setting process operation by the system will now be explained in accordance with the flow chart of FIG. 14.

In the flow chart, the configuration designer selects a specification item which is fitted to a request of a customer (S6001). As to a specification item to which the client does not especially have a request, the configuration designer selects "entrust specification item to system" (S6002). In any case, the system sets a flag for indicating that the relevant specification item has temporarily been selected (S6003). The configuration designer continues this process operation until the customer request can be satisfied (S6004).

Next, the configuration designer inputs a completion of the configuration designing operation (S6005). Upon receipt of this input, the automatic specification setting unit 13 firstly extracts such a specification item which has not been selected, or has not been entrusted to the system from the specification items which are regarded as the necessary specification items in view of a configuration of a product, and prompts the configuration designer to input any one of the specification items (S6006).

Upon receipt of the result which has been additionally entered by the configuration designer, the specification managing unit 11 automatically selects an optimum specification value based upon the automatic setting information table with respect to the specification item entrusted to the system based upon the specification selected status updated by the specification managing unit 11 (S6007). At a time instant when the automatic selecting operations are accomplished as to all of the entrusted specification items, a configuration designing screen is produced by the screen producing unit 12, and then, the specification item and the specification value which have been set are displayed on the screen (S6008).

In order to input that each of the specification items is entrusted to the system, for example, this item input operation may be carried out by using such a user interface as a screen 620 shown in FIG. 15. If a check box 621 is clicked, then the selection of the relevant specification item 622 may be entrusted to the system. In addition, alternatively, the configuration designer may click a list box 627 and, for example, may select only both a specification value 624 and a specification value 625, and may exclude a specification value 626 within these three specification values 624 to 626 from the list 623, so that the configuration designer may focus on an automatic selected candidate by the system.

Also, since the rule is changed, for example, a selection of a specification may be automatically and alternatively adjusted in such a manner that an estimated price may be limited to a budget designated by a customer. As a result of the specification value selection, in the case that an estimated price of a product exceeds a budget of the client which has been previously registered, an optimum option is released form the options entrusted to the system, so that the resulting estimated price may be limited to the budget. At this time, the selection base implies that, for instance, such options are released from an option having a higher unit price.

Figure 29:
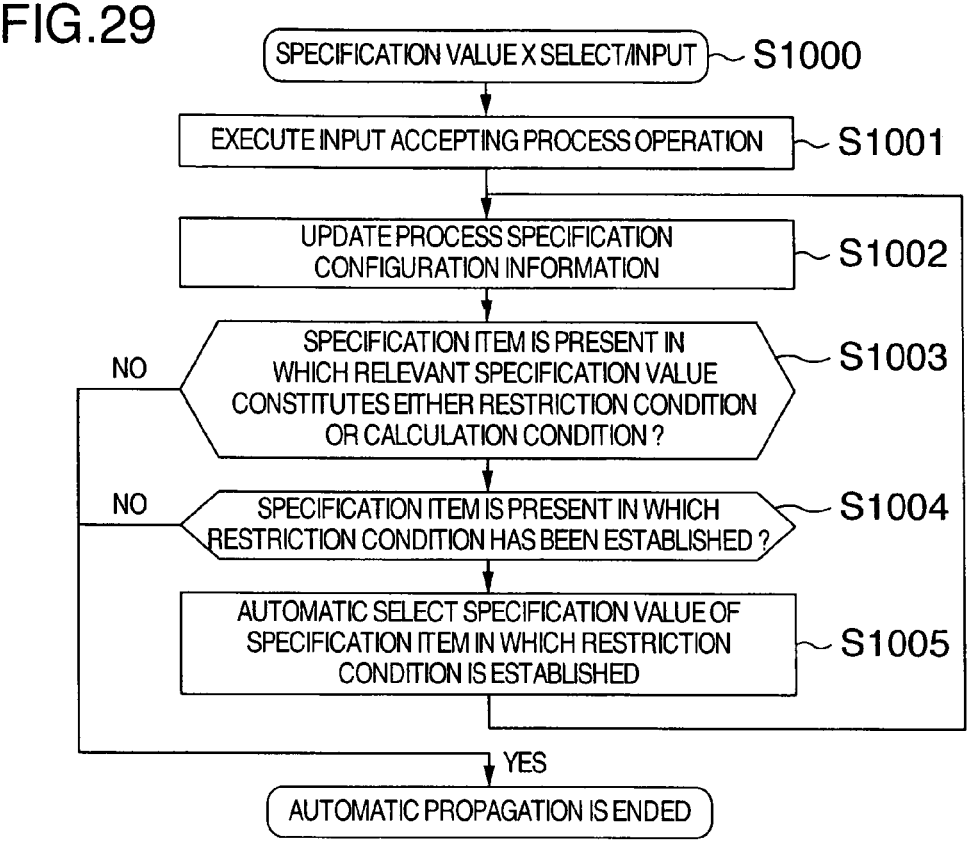
FIG. 29 is a flow chart for describing a chain process operation of an automatic selection.

With reference to FIG. 29, a description is made of process operations for automatically calculating a specification item and a specification value. The configuration designer selects, or inputs a specification value (S1000). A design calculating means performs an input accepting process operation (S1001). An updating process operation of specification configuration information is carried out (S1002). A specification item in which the relevant specification value constitutes either a restriction condition or a calculation condition is searched (S1003). In the case that the searched specification item is hit, a check as to whether or not the restriction condition can be established as to the relevant specification item (S1004). The established specification item is automatically into a selected status (S1005). The process operation is returned to S1002 as to the specification item which has newly selected. The automatic selecting operation is carried out in a chain manner by executing the above-described sequential operations, and then, if there is no relevant specification item, then the process operation is accomplished.

When a certain specification item is defined, there are some cases that both a maximum value and a minimum value are determined as to an input value of another specification item, while the above-described definition is used as a trigger. In the case that a range restriction is present, information is provided to the configuration designer in any one of the below-mentioned events:

(1) Previous Indication of Possible Input Range;

The possible input range is displayed in a specification item area. Otherwise, when a pointer is located in the relevant input area, the pointer is pop-up displayed. Alternatively, the pointer is displayed in the vicinity of the relevant input area.

(2) Input Check;

A check is made as to whether or not a value inputted by a user can satisfy a range restriction, and if the input value cannot satisfy the range restriction, an error message is displayed.

(14) Conducting Process Operation by System to Standard Specification

Next, a description is made of conducting process operation by the system to the standard specification with reference to FIG. 16 to FIG. 19.

Figure 17:
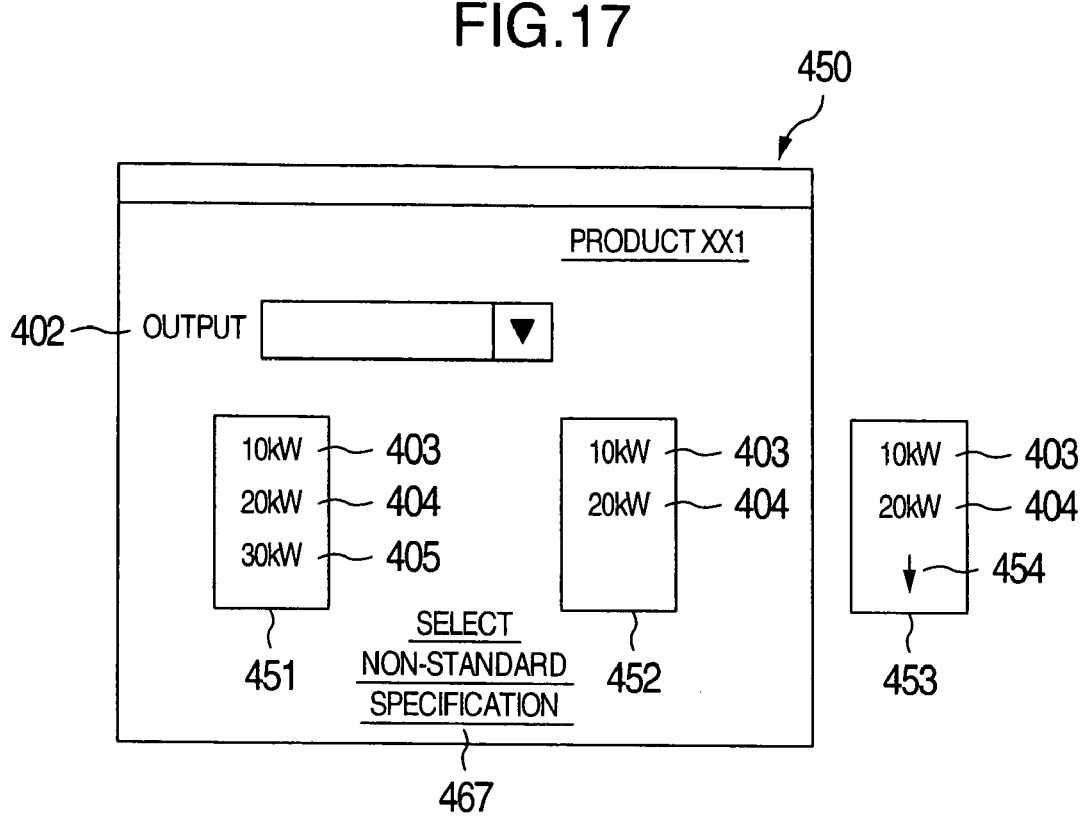
FIG. 17 is a diagram for showing an example of a configuration designing screen (No. 3).
Figure 18:
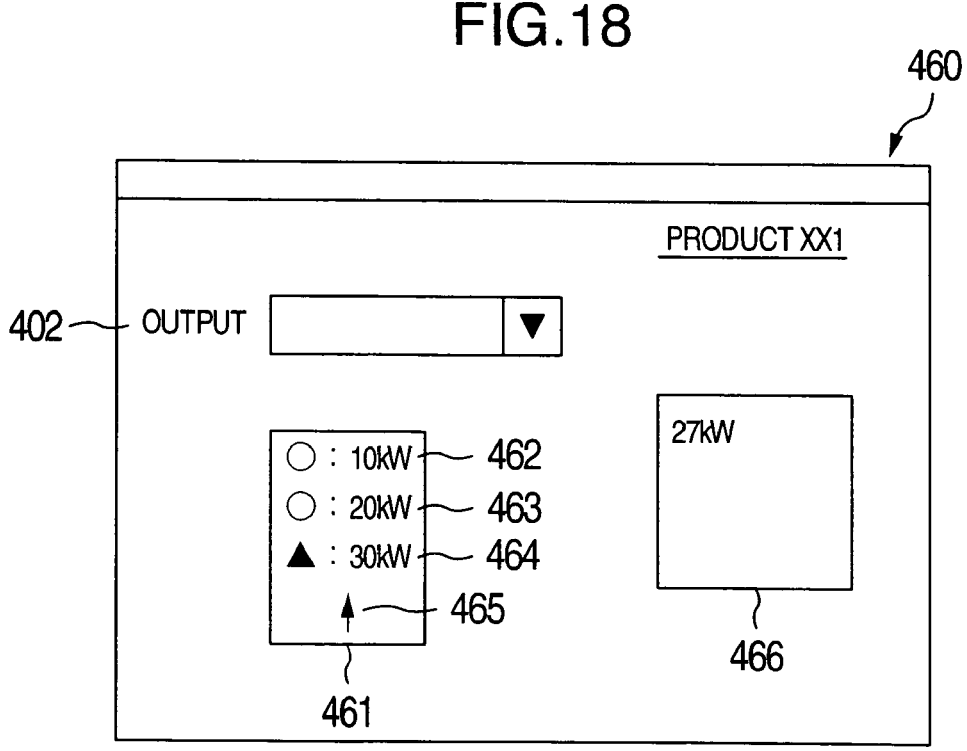
FIG. 18 is a diagram for showing an example of a configuration designing screen (No. 4).

FIG. 16 is a diagram for indicating an example of a specification item setting screen (No. 2). FIG. 17 is a diagram for showing an example of a configuration designing screen (No. 3). FIG. 18 is a diagram for indicating an example of the configuration designing screen (No. 4). FIG. 19 is a diagram for representing one example of a specification substitution idea providing screen.

The product configuration design aiding system of the present invention owns such a function that when a selection of a customer may probably become a non-standard specification, since a substitution idea which becomes the standard specification is provided, it is possible to avoid that a specification of a product becomes such a non-standard specification.

For example, it is so assumed that a restriction condition is established in such specification items shown in FIG. 16. Under this assumed restriction condition, this drawing indicates that when a specification value of a specification item "setting method of component" corresponds to "lateral", "10 kW", "20 kW", and "30 kW" may be employed as a specification value of an specification item "output." Also, when a specification value of a specification item "setting method of component" corresponds to "longitudinal", "10 kW", and "20 kW", may be employed as the specification value of the specification item "output." As a consequence, on the configuration designing screen (FIG. 17), when the specification value of the specification item "setting method of component" corresponds to "lateral", a list 451 is displayed, whereas when the specification value of the specification item "setting method of component" corresponds to "longitudinal", a list box 452 is displayed. In other words, both "10 kW" of the specification value 403 and "20 kW" of the specification value 404 can be set irrespective of the specification value of the specification item "setting method of component." However, "30 kW" of the specification value 405 can be selected only when the specification value of the specification item "setting method of component" corresponds to "lateral."

In the case that "lateral" of the specification value 412 has already been selected by the configuration designer prior to a selection of "output" of the specification item 402, the list 451 is displayed based upon the restriction condition. However, in such a case that the configuration designer has selected "longitudinal" of the specification value 411, the list 452 is displayed, and thus, since "30 kW" of the specification value 405 is not displayed, this specification value 405 cannot be selected. In such a case that any of the values selectable in both the displayed list 451 and the displayed list 452 cannot meet the requirement of the customer, "output" of the specification item 402 must be defined as a non-standard specification. To this end, in order to request a selection of a non-standard specification, the below-mentioned list 453 may be conceived.

For instance, when a virtual selection branch 454 such as "↓" is selected, as represented in a screen 460 of FIG. 18, a list 453 is updated, and selection candidates which neglect the restriction condition are displayed as represented in a list 461. At this time, this drawing indicates that both a specification value 462 and a specification value 463 correspond to the selection of the standard specification in accordance with the restriction, whereas a specification value 464 corresponds to the selection of the non-standard specification which neglects the restriction. In order to discriminate both the specification values from each other, for instance, symbol "○" which implies the standard is applied in front of the specification value, and symbol "▲" which implies the non-standard is applied in front of the specification value. Also, for example, such a virtual selection branch 465 as "↑" corresponds to a selection branch by which a non-standard specification is not selected, and a selection is returned to the list 452 followed to the restriction.

Also, if "↓" of the virtual selection branch 454 is selected, then not only the list is updated, but also a non-standard specification describing column 466 is displayed at the same time. This description column 466 corresponds to such a column into which a required specification is described in the case that any of these specification values 462 to 464 cannot be satisfied.

The above-explained operation may be replaced by the following operation instead of such an operation that the virtual selection branch "↓" indicative of the non-standard specification is displayed in the list 453. That is, for example, while a button 467 may be alternatively set on the side of the list, the list 461 and the describing column 466 may be alternatively displayed by clicking the button 467.

When the configuration designer requests the specification 464 which is originally not selectable due to the restriction, the automatic specification setting means 13 firstly searches the specification value 411 which corresponds to the previously selected specification value which constitutes the restriction condition of the relevant specification value. In order that the restriction is released and "30 kW" of the specification value 464 is selected as the standard specification, the automatic specification setting means 13 proposes that the selection of "longitudinal" of the specification value 411 as to "setting method of component" of the specification item is released, and instead of this selection, "lateral" of the specification value 412 is selected.

In the case that a plurality of substitution ideas are present, candidates of the substitution ideas are sorted based upon a predetermined rule, and the sorted candidates are displayed. As one example, such evaluation is used as a reference, for example, a price increase and a variation of an appointed delivery date are minimum, which are caused by selecting a substitution idea, or weighting of a specification item to be changed is minimum. For example, since a comparison list 471 is displayed on the specification substitution idea providing screen 470 shown in FIG. 19, a conduction to the standard specification is made with respect to a customer. In the case that a plurality of substitution ideas are present, substitution (1), - - -, are arranged along the lateral direction, and an idea selected by the check box 472 is compared with a non-standard specification selected by the customer.

A specification configuration 473 lists up specification items in which previously selected results must be changed in order that the relevant non-standard specification is stored in the standard range. A price 474 indicates a combined unit price as to specification values designated by the specification configuration 473. An appointed delivery date 475 corresponds to a difference between an appointed delivery date of a customer and the shortest appointed delivery date which is calculated by an LT of a specification value designated by the specification configuration 473. In a column of differences, a difference 476 of the configurations, a difference 477 of the prices, and a difference 478 of the appointed delivery dates are indicated respectively. The configuration difference 476 corresponds to a total number of difference items in faithful configurations for the customer request and the configurations for the substitution ideas. The configuration difference 476 also indicates as to whether or not an essential specification item is contained so as to provide a base for judging a magnitude of an influence. The price difference 477 corresponds to a difference of unit prices related to the specification configuration. The appointed delivery date difference 478 is to judge whether or not an LT related to a specification configuration may conduct a delay with respect to an appointed delivery date requested by a customer.

As to such a specification value which constitutes the non-standard specification, since both a unit price and an LT are not yet determined, a reference value is previously registered in the unit of specification item, and this registered reference value is used to calculate these items. An LT includes not only the days for manufacturing but also the days including a lead time for a design or a arranging.

In the case that the customer agrees this proposal, the automatic specification setting unit 13 corrects the result of a selection so as to the "setting method of component" of the specification item is changed into the "lateral" of the specification value 412. According to this, the specification managing unit 11 updates a selectable specification item of specification value and selects "30 kW" of the specification value 464. Then, the result of the selection is registered into the specification configuration information database 21A as a standard specification. A list is returned to the status of list 451.

In the case that the customer refuses this proposal and requests such a specification which is fitted to the selected result, the automatic specification setting unit 13 registers such a fact that the relevant specification item 402 has been defined as the non-standard specification into the specification configuration information database 21A.

Also, in such a case that a content of a non-standard specification is described in the describing column 466 shown in FIG. 18, the content described with respect to this specification item is set as a specification value.

(15) Reuse of Subject Information

When a configuration designing operation is carried out, since another specification configuration information 21A is reused, a total number of input steps can be largely reduced. Another specification configuration information indicates specification configuration information in an actual subject, or such a specification structural information (template) which is not an actual result, but has been formed under such an assumption that "appearance frequency is high" has been previously defined. This reuse sequential operation will now be explained with reference to FIG. 30.

One of the reuse methods is realized by that specification configuration information is duplicated in the unit of a subject, and this specification configuration information is corrected. On a subject list screen 710 of FIG. 31, a check box applied to a subject number "003" is checked so as to specify the subject, and thereafter, a copy button 718 is clicked, so that a new subject made of the same specification configuration information as the subject number "003" can be produced.

Another method of reuse corresponds to such a method that configuration information in the unit of a machine sort is duplicated under the same subject, and this configuration information is corrected.

A check box applied to a machine sort 2 of the subject information screen 730 shown in FIG. 28 is checked so as to specify a machine sort, and thereafter, the copy button 718 is clicked, so that the same specification configuration information as that related to this specified machine sort can be added under this subject. Since the configuration designer corrects this specification selected result, the specification configuration information can be easily formed in the case that the same machine sort whose specification is different is involved under one subject.

A further method of reuse is such a method that an arbitrary range is copied from either a single piece or plural pieces of other specification configuration information, a new subject is formed, or added to a subject designated by the configuration designer.

Figure 30:
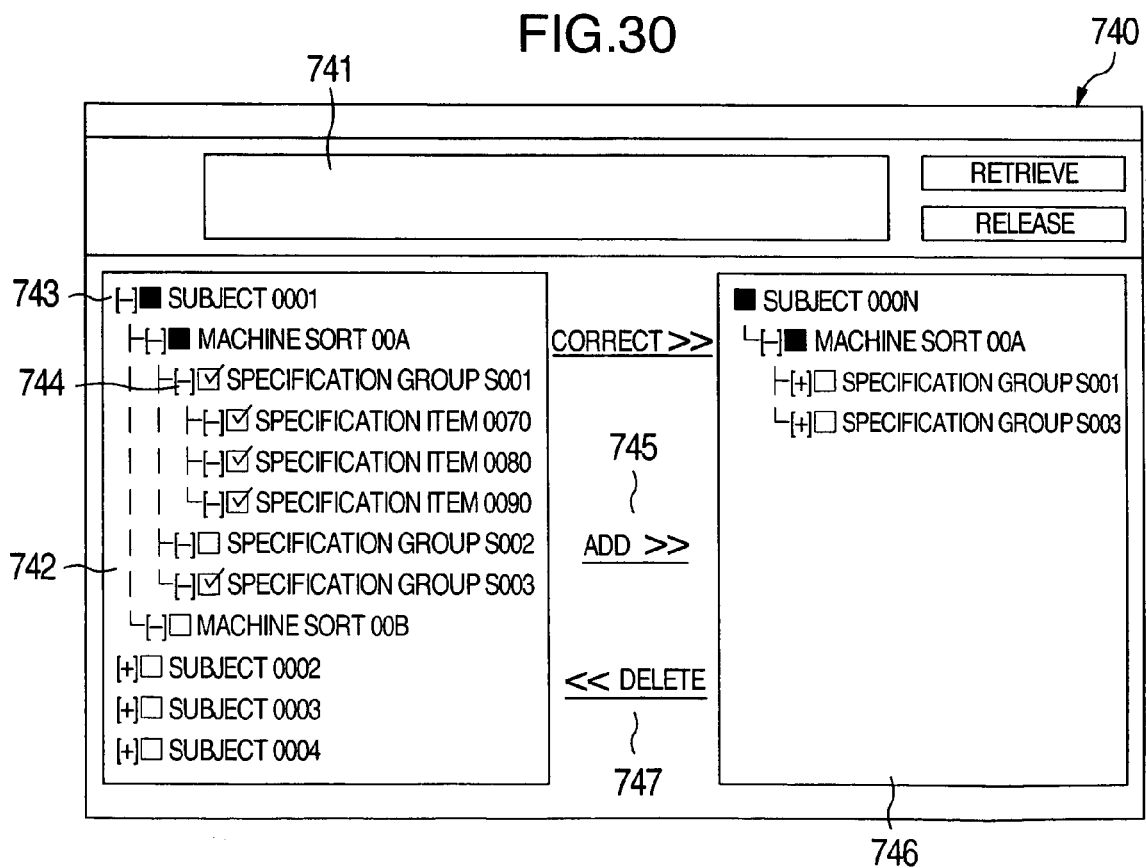
FIG. 30 is a diagram for indicating an example of a screen on which subject information is copied and recused.

FIG. 30 is one example of a subject copy screen. A retrieve column 741 corresponds to a keyword input area which limits a subject which is wanted to be observed among the specification configuration information. Specification configuration information 742 to be observed is displayed in 4 hierarchical layers on a tree, namely, 1) subject; 2) machine sort under relevant subject; 3) specification group under relevant machine sort; and 4) specification item under relevant specification group and specification value corresponding to selected result thereof. Display/not display of lower-grade tree can be switched by an expansion button 743. The configuration designer can set arbitrary copy range by selecting the check box 744.

For instance, since a machine sort "00A" under a subject "0001" is checked, specification configuration information related to a plurality of specification groups is obtained. Among these specification groups, a check of such a specification group "S002" is released, so that only the specification configuration information related to other specific groups "S001" and "S003" can be duplicated. In this case, since an add button 745 is clicked, this duplicated information can be stored under a new subject 746. Such an information which has once stored in the subject 746 may be partially deleted in such a way that after a similar check box operation has been carried out, a delete button 747 is depressed. Alternatively, the following method may be conceived. That is, an existing subject may be called instead of a new subject by executing a similar sequential operation, and information may be further copied from another subject with respect to this existing subject.

Although specification items may be collected from either plural subjects or plural templates within an arbitrary range as to specification configuration information, such an avoiding measure may be provided, namely when specification items of an original source are overlapped with each other, an error message is provided. Also, another measure may be carried out. That is, in the case that a specification item which was valid in the past master is not allowed to be applied at a duplication time instant, this status is handled as an error process to be brought into a not-selected status.

(16) Screen Control

It should also be noted that a screen design of a configuration designing screen may be customized by changing the data of the screen control information database 21D.

As the data related to the screen design of the configuration designing screen, the following sorts of data are provided, namely, an order for arranging specification items, colors of the screen, sorts (list box, check box, etc) of objects to be displayed, present/absent of an image, a storage location of an image file, and the like.

At this time, the image producing unit 12 produces a configuration designing screen in accordance with the data of the screen control information database 21D, and then displays the produced configuration designing screen.

It should be further understood by those skilled in the art that although the foregoing description has been made on embodiments of the invention, the invention is not limited thereto and various changes and modifications may be made without separating from the spirit of the invention and the scope of the appended claims.

The invention claimed is:

1. A product configuration design aiding system for aiding a configuration designing operation in which a plurality of basic items as to a specification of a product which constitutes a base of a design are defined as respective specification items, one or more specification values which are selectable for the respective specification item is previously set-up as a selectable option by a product designer, and where specification values are user-selectable by a product configuration designer for the respective specification items of a product in the design of a configuration within a range where the set specification value and a restriction condition are satisfied, so as to complete the product designing operation, comprising:

a memory unit containing a specification configuration information database in which each data of a specification item, a specification value, a restriction condition and a product to which the restriction condition is applied is constituted in a list form, and the restriction condition is a limitation where one specific specification item and another specific specification item has a restriction relationship such that, in order that the one specific specification item has a specific value corresponding to the product to which the restriction condition is applied, then the another specific specification item must have a predetermined specific value; and specification managing means for holding and updating such a status that a configuration designer selects both a specification item and a specification value of a product to be designed; wherein:

said specification managing means seeks a data record having a list form described in said specification configuration information database based upon both said specification item and said specification value which have already been selected, and defines other specification items and other specification values which are not user-selected and which can satisfy said restriction condition, as a candidate to be indicated to the configuration designer; and wherein:

said product configuration design aiding system is further comprised of:

screen producing means for producing a configuration designing screen which displays both said defined specification item and said defined specification value to the configuration designer, and prompts the configuration designer to select an available standard specification which can satisfy the restriction condition;

where the memory unit further containing a specification selecting rule information database which records a rule for setting a default value or a specification value for a specification item in case that the configuration designer omits a selection, by the system, in correspondence with the specification time and the specification value; and automatic setting means for retrieving said specification selecting rule information database, and setting the specification value automatically in accordance with the corresponding default value or rule information, in case that the configuration designer omits selecting the specification value of the specification item, and the specification value is entrusted to the system on said configuration designing screen.

2. A product configuration design aiding system for aiding a configuration designing operation in which a plurality of basic items as to a specification of a product which constitutes a base of a design are defined as respective specification items, one or more specification values which are selectable for the respective specification item is previously as a selectable option by a product designer, and where specification values are user-selectable by a product configuration designer for the respective specification items of a product in the design of a configuration within a range where the set specification value and a restriction condition are satisfied, so as to complete the product designing operation, comprising:

a memory unit containing a specification configuration information database in which each data of a specification item, a specification value, a restriction condition and a product to which the restriction condition is applied is constituted in a list form, and the restriction condition is a limitation where one specific specification item and another specific specification item has a restriction relationship such that, in order that the one specific specification item has a specific value corresponding to the product to which the restriction condition is applied, then the another specific specification item must have a predetermined specific value; and specification managing means for holding and updating such a status that a configuration designer selects both a specification item and a specification value of a product to he designed; wherein:

said specification managing means seeks a data record having a list form described in said specification configuration information database based upon both said specification item and said specification value which have already been selected, and defines other specification items and other specification values which are not user-selected and which can satisfy said restriction condition, as a candidate to be indicated to the configuration designer; and wherein:

said product configuration design aiding system is further comprised of:

screen producing means for producing a configuration designing screen which displays both said defined specification item and said defined specification value to the configuration designer, and prompts the configuration designer to select an available standard specification which can satisfy the restriction condition;

design calculating means for managing relationships between specification items and specification values described in the restriction condition in a network shape, for judging as to whether or not a specification item and a specification value can be applied in such a sequential order that a chain of the restriction relationship is not interrupted with respect to an input of the configuration designer, or for calculating a specification value.

3. A product configuration design aiding system for aiding a configuration designing operation in which a plurality of basic items as to a specification of a product which constitutes a base of a design are defined as respective specification items, one or more specification values which are selectable for the respective specification item is previously set-up as a selectable option by a product designer, and where specification values are user-selectable by a product configuration designer for the respective specification items of a product in the design of a configuration within a range where the set specification value and a restriction condition are satisfied, so as to complete the product designing operation, comprising:

a memory unit containing a specification configuration information database in which each data of a specification item, a specification value, a restriction condition and a product to which the restriction condition is applied is constituted in a list form, and the restriction condition is a limitation where one specific specification item and another specific specification item has a restriction relationship such that, in order that the one specific specification item has a specific value corresponding to the product to which the restriction condition is applied then the another specific specification item must have a predetermined specific value; and specification managing means for holding and updating such a status that a configuration designer selects both a specification item and a specification value of a product to be designed; wherein:

said specification managing means seeks a data record having a list form described in said specification configuration information database based upon both said specification item and said specification value which have already been selected, and defines other specification items and other specification values which are not user-selected and which can satisfy said restriction condition, as a candidate to be indicated to the configuration designer; and wherein:

said product configuration design aiding system is further comprised of:

screen producing means for producing a configuration designing screen which displays both said defined specification item and said defined specification value to the configuration designer, and prompts the configuration designer to select an available standard specification which can satisfy the restriction condition;

automatic specification setting means for seeking a combined specification value available for specification values of other specification items in order to satisfy said restriction condition, and providing a result of said seeking, when the configuration designer inputs a specification value which cannot satisfy the restriction condition with respect to a certain specification item.

4. A product configuration design aiding system as claimed in claim 3, further comprising:

means for editing the data of said specification arranging information database by way of a screen operation.

5. A product configuration design aiding system for aiding a configuration designing operation in which a plurality of basic items as to a specification of a product which constitutes a base of a design are defined as respective specification items, one or more specification values which are selectable for the respective specification item is previously set-up as a selectable option by a product designer, and where specification values are user-selectable by a product configuration designer for the respective specification items of a product in the design of a configuration within a range where the set specification value and a restriction condition are satisfied, so as to complete the product designing operation, comprising:

a memory unit containing a specification configuration information database in which each data of a specification item, a specification value, restriction condition and a product to which the restriction condition is applied is constituted in a list form, and the restriction condition is a limitation where one specific specification item and another specific specification item has a restriction relationship such that, in order that the one specific specification item has a specific value corresponding to the product to which the restriction condition is applied, then the another specific specification item must have a predetermined specific value; and specification managing means for holding and updating such a status that a configuration designer selects both a specification item and a specification value of a product to be designed; wherein:

said specification managing means seeks a data records having a list form described in said specification configuration information database based upon both said specification item and said specification value which have already been selected, and defines other specification items and other specification values which are not user-selected and which can satisfy said restriction conditions, as a candidate to be indicated to the configuration designer; and wherein:

said product configuration design aiding system is further comprised of:

screen producing means for producing a configuration designing screen which displays both said defined specification item and said defined specification value to the configuration designer, and prompts the configuration designer to select an available standard specification which can satisfy the restriction condition;

design calculating means for calculating an influence of a selection and a change before a specification value is determined;

wherein said screen producing means for providing said influence as an alarm to a user, so that the product configuration design aiding system is capable of designing a configuration which meets with an intention of the user while avoiding a retry.

6. A product configuration design aiding system for aiding a configuration designing operation in which a plurality of basic items as to a specification of a product which constitutes a base of a design are defined as respective specification items, one or more specification values which are selectable for the respective specification item is previously set-up as a selectable option by a product designer, and where specification values are user-selectable by a product configuration designer for the respective specification items of a product in the design of a configuration within a range where the set specification value and a restriction condition are satisfied, so as to complete the product designing operation, comprising:

a memory unit containing a specification configuration information database in which each data of a specification item, a specification value, a restriction condition and a product to which the restriction condition is applied is constituted in a list form, and the restriction condition is a limitation where one specific specification item and another specific specification item has a restriction relationship such that, in order that the one specific specification item has a specific value corresponding to the product to which the restriction condition is applied, then the another specific specification item must have a predetermined specific value; and specification managing means for holding and updating such a status that a configuration designer selects both a specification item and a specification value of a product to be designed; wherein:

said specification managing means seeks a data record having a list form described in said specification configuration information database based upon both said specification item and said specification value which have already been selected, and defines other specification items and other specification values which are not user-selected and which can satisfy said restriction conditions, as a candidate to be indicated to the configuration designer; and wherein:

said product configuration design aiding system is further comprised of:

screen producing means for producing a configuration designing screen which displays both said defined specification item and said defined specification value to the configuration designer, and prompts the configuration designer to select an available standard specification which can satisfy the restriction condition;

where the memory unit further containing a subject information database containing an attribute of a customer, a specification required by the customer, and a specification selection history: and a specification arranging information database which describes a price with respect to each of said specification values of said specification item and a lead time required for an appointed delivery date with respect to each of said specification values; and while referring to both said subject information database and said specification arranging information database, a combination of said specification values with respect to said specification item is provided in such a manner that the price and the lead time required by the customer and stored in said subject information database can be satisfied.

7. A product configuration design aiding system for aiding a configuration designing operation in which a plurality of basic items as to a specification of a product which constitutes a base of a design are defined as respective specification items, one or more specification values which are selectable for the respective specification item is previously set-up as a selectable option by a product designer, and where specification values are user-selectable by a product configuration designer for the respective specification items of a product in the design of a configuration within a range where the set specification value and a restriction condition are satisfied, so as to complete the product designing operation, comprising:

a memory unit containing a specification configuration information database in which each data of a specification item, a specification value, a restriction condition and a product to which the restriction condition is applied is constituted in a list form, and the restriction condition is a limitation where one specific specification item and another specific specification item has a restriction relationship such that, in order that the one specific specification item has a specific value corresponding to the product to which the restriction condition is applied, then the another specific specification item must have a predetermined specific value; and specification managing means for holding and updating such a status that a configuration designer selects both a specification item and a specification value of a product to be designed; wherein:

said specification managing means seeks a data record having a list form described in said specification configuration information database based upon both said specification item and said specification value which have already been selected, and defines other specification items and other specification values which are not user-selected and which can satisfy said restriction conditions, as a candidate to be indicated to the configuration designer; and wherein:

said product configuration design aiding system is further comprised of:

screen producing means for producing a configuration designing screen which displays both said defined specification item and said defined specification value to the configuration designer, and prompts the configuration designer to select an available standard specification which can satisfy the restriction condition;

design calculating means for holding section information which indicates that a determined specification value is originated from any of statuses such as an arbitrary status by a user, a default, and an automatic selection; and screen producing means for providing the status of the specification value determined based upon said section information to the user.

8. A product configuration design aiding system for aiding a configuration designing operation in which a plurality of basic items as to a specification of a product which constitutes a base of a design are defined as respective specification items, one or more specification values which are selectable for the respective specification item is previously set-up as a selectable option by a product designer, and where specification values are user-selectable by a product configuration designer for the respective specification items of a product in the design of a configuration within a range where the set specification value and a restriction condition are satisfied, so as to complete the product designing operation, comprising:

a memory unit containing a specification configuration information database in which each data of a specification item, a specification value, a restriction condition and a product to which the restriction condition is applied is constituted in a list form, and the restriction condition is a limitation where one specific specification item and another specific specification item has a restriction relationship such that, in order that the one specific specification item has a specific value corresponding to the product to which the restriction condition is applied, then the another specific specification item must have a predetermined specific value; and specification managing means for holding and updating such a status that a configuration designer selects both a specification item and a specification value of a product to be designed; wherein:

said specification managing means seeks a data record having a list form described in said specification configuration information database based upon both said specification item and said specification value which have already been selected, and defines other specification items and other specification values which are not user-selected and which can satisfy said restriction conditions, as a candidate to be indicated to the configuration designer; and wherein:

said product configuration design aiding system is further comprised of:

screen producing means for producing a configuration designing screen which displays both said defined specification item and said defined specification value to the configuration designer, and prompts the configuration designer to select an available standard specification which can satisfy the restriction condition;

wherein a specification selected result is duplicated within an arbitrary range by configuration design referring means for referring to/comparing with each other past specification configuration information, or template information; said duplicated specification selected result is corrected, a selecting step of the user is aided; and such a plurality of selected results are compared with each other, and a difference between them is displayed.

* * * * *